(12) United States Patent (10) Patent No.: US 12,381,482 B2
Giuliano (45) Date of Patent: Aug. 5, 2025

(54) POWER CONVERTER WITH MODULAR STAGES CONNECTED BY FLOATING TERMINALS

(71) Applicant: pSemi Corporation, San Diego, CA (US)

(72) Inventor: David M. Giuliano, Bedford, NH (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 18/470,434

(22) Filed: Sep. 20, 2023

(65) Prior Publication Data

US 2024/0275277 A1 Aug. 15, 2024

Related U.S. Application Data

(63) Continuation of application No. 17/938,350, filed on Oct. 6, 2022, now Pat. No. 11,817,778, which is a (Continued)

(51) Int. Cl.
*H02M 3/07* (2006.01)
*H02M 1/42* (2007.01)
(Continued)

(52) U.S. Cl.
CPC .............. *H02M 3/07* (2013.01); *H02M 1/42* (2013.01); *H02M 1/4225* (2013.01); *H02M 3/00* (2013.01);
(Continued)

(58) Field of Classification Search
CPC ........ H02M 3/07; H02M 1/42; H02M 1/4225; H02M 3/00; H02M 3/158; H02M 1/007;
(Continued)

(56) References Cited

U.S. PATENT DOCUMENTS 3,370,215 A 2/1968 Light, Jr.
3,745,437 A 7/1973 Brown
(Continued)

FOREIGN PATENT DOCUMENTS

CN 1057410 A 1/1992
CN 1132959 A 10/1996
(Continued)

OTHER PUBLICATIONS

U.S. Appl. No. 61/380,522, Chris Levesque et al., filed Sep. 7, 2010.
(Continued)

*Primary Examiner* — Adam D Houston
(74) *Attorney, Agent, or Firm* — Haynes and Boone, LLP

(57) ABSTRACT

An apparatus for electric power conversion includes a converter having a regulating circuit and switching network. The regulating circuit has magnetic storage elements, and switches connected to the magnetic storage elements and controllable to switch between switching configurations. The regulating circuit maintains an average DC current through a magnetic storage element. The switching network includes charge storage elements connected to switches that are controllable to switch between plural switch configurations. In one configuration, the switches forms an arrangement of charge storage elements in which at least one charge storage element is charged using the magnetic storage element through the network input or output port. In another, the switches form an arrangement of charge storage elements in which an element discharges using the magnetic storage element through one of the input port and output port of the switching network.

20 Claims, 20 Drawing Sheets

Related U.S. Application Data continuation of application No. 17/456,235, filed on Nov. 23, 2021, now Pat. No. 11,496,047, which is a continuation of application No. 17/187,664, filed on Feb. 26, 2021, now Pat. No. 11,211,862, which is a continuation of application No. 16/931,768, filed on Jul. 17, 2020, now Pat. No. 10,938,300, which is a continuation of application No. 16/444,428, filed on Jun. 18, 2019, now Pat. No. 10,917,007, which is a continuation of application No. 15/618,481, filed on Jun. 9, 2017, now Pat. No. 10,326,358, which is a continuation of application No. 15/138,692, filed on Apr. 26, 2016, now Pat. No. 9,712,051, which is a continuation of application No. 14/513,747, filed on Oct. 14, 2014, now Pat. No. 9,362,826, which is a continuation of application No. 13/771,904, filed on Feb. 20, 2013, now Pat. No. 8,860,396, which is a continuation of application No. PCT/US2012/036455, filed on May 4, 2012.

(60) Provisional application No. 61/577,271, filed on Dec. 19, 2011, provisional application No. 61/548,360, filed on Oct. 18, 2011, provisional application No. 61/482,838, filed on May 5, 2011.

(51) Int. Cl.
  *H02M 3/00* (2006.01)
  *H02M 3/158* (2006.01)
  *H02M 1/00* (2006.01)

(52) U.S. Cl.
  CPC ............ *H02M 3/158* (2013.01); *H02M 1/007* (2021.05); *H02M 1/4291* (2021.05); *H02M 3/077* (2021.05); *H02M 3/1582* (2013.01); *Y02B 70/10* (2013.01)

(58) Field of Classification Search
  CPC .. H02M 1/4291; H02M 3/077; H02M 3/1582; Y02B 70/10
  See application file for complete search history.

(56) References Cited

U.S. PATENT DOCUMENTS

| | | |
|---|---|---|
| 3,818,306 A | 6/1974 | Marini |
| 3,818,360 A | 6/1974 | Boutmy et al. |
| 4,214,174 A | 7/1980 | Dickson |
| 4,408,268 A | 10/1983 | Peters et al. |
| 4,415,959 A | 11/1983 | Vinciarelli |
| 4,513,364 A | 4/1985 | Nilssen |
| 4,604,584 A | 8/1986 | Kelley |
| 4,713,742 A | 12/1987 | Parsley |
| 4,812,961 A | 3/1989 | Essaff et al. |
| 4,903,181 A | 2/1990 | Seidel |
| 5,006,782 A | 4/1991 | Pelly |
| 5,057,986 A | 10/1991 | Henze et al. |
| 5,119,283 A | 6/1992 | Steigerwald et al. |
| 5,132,606 A | 7/1992 | Herbert |
| 5,132,895 A | 7/1992 | Kase |
| 5,159,539 A | 10/1992 | Koyama |
| 5,198,970 A | 3/1993 | Kawabata et al. |
| 5,268,832 A | 12/1993 | Kandatsu |
| 5,301,097 A | 4/1994 | McDaniel |
| 5,331,303 A | 7/1994 | Shiota |
| 5,345,376 A | 9/1994 | Nourbakhsh |
| 5,402,329 A | 3/1995 | Wittenbreder, Jr. |
| 5,548,206 A * | 8/1996 | Soo ............... H02M 3/1588 323/224 |
| 5,557,193 A | 9/1996 | Kajimoto |
| 5,563,779 A | 10/1996 | Cave et al. |
| 5,581,454 A | 12/1996 | Collins |
| 5,602,794 A | 2/1997 | Javanifard et al. |
| 5,610,807 A | 3/1997 | Kanda et al. |
| 5,661,348 A | 8/1997 | Brown |
| 5,717,581 A | 2/1998 | Canclini |
| 5,737,201 A | 4/1998 | Meynard et al. |
| 5,761,058 A | 6/1998 | Kanda et al. |
| 5,793,626 A | 8/1998 | Jiang |
| 5,801,987 A | 9/1998 | Dinh |
| 5,812,017 A | 9/1998 | Golla et al. |
| 5,831,846 A | 11/1998 | Jiang |
| 5,892,395 A | 4/1999 | Stengel et al. |
| 5,907,484 A | 5/1999 | Kowshik et al. |
| 5,956,243 A | 9/1999 | Mao |
| 5,959,565 A | 9/1999 | Taniuchi et al. |
| 5,959,585 A | 9/1999 | Militz |
| 5,978,283 A | 11/1999 | Hsu et al. |
| 5,982,645 A | 11/1999 | Levran et al. |
| 5,991,169 A | 11/1999 | Kooken |
| 6,021,056 A | 2/2000 | Forbes et al. |
| 6,055,168 A | 4/2000 | Kotowski et al. |
| 6,084,789 A | 7/2000 | Van Lieshout |
| 6,107,864 A | 8/2000 | Fukushima et al. |
| 6,133,788 A | 10/2000 | Dent |
| 6,140,807 A | 10/2000 | Vannatta et al. |
| 6,154,380 A | 11/2000 | Assow et al. |
| 6,157,253 A | 12/2000 | Sigmon et al. |
| 6,169,457 B1 | 1/2001 | Ichimaru |
| 6,169,673 B1 | 1/2001 | McIntyre et al. |
| 6,178,102 B1 | 1/2001 | Stanley |
| 6,198,645 B1 | 3/2001 | Kotowski et al. |
| 6,255,896 B1 | 7/2001 | Li et al. |
| 6,255,906 B1 | 7/2001 | Eidson et al. |
| 6,275,018 B1 | 8/2001 | Telefus et al. |
| 6,316,956 B1 | 11/2001 | Oglesbee |
| 6,327,462 B1 | 12/2001 | Loke et al. |
| 6,329,796 B1 | 12/2001 | Popescu |
| 6,339,538 B1 | 1/2002 | Handleman |
| 6,362,986 B1 | 3/2002 | Schultz et al. |
| 6,377,117 B2 | 4/2002 | Oskowsky et al. |
| 6,396,341 B1 | 5/2002 | Pehlke |
| 6,400,579 B2 | 6/2002 | Cuk |
| 6,429,632 B1 | 8/2002 | Forbes et al. |
| 6,456,153 B2 | 9/2002 | Buck et al. |
| 6,476,666 B1 | 11/2002 | Palusa et al. |
| 6,486,728 B2 | 11/2002 | Kleveland |
| 6,501,325 B1 | 12/2002 | Meng |
| 6,504,422 B1 | 1/2003 | Rader et al. |
| 6,507,503 B2 | 1/2003 | Norrga |
| 6,515,612 B1 | 2/2003 | Abel |
| 6,563,235 B1 | 5/2003 | McIntyre et al. |
| 6,597,235 B2 | 7/2003 | Choi |
| 6,617,832 B1 | 9/2003 | Kobayashi |
| 6,650,552 B2 | 11/2003 | Takagi et al. |
| 6,657,876 B2 | 12/2003 | Satoh |
| 6,700,803 B2 | 3/2004 | Krein |
| 6,738,277 B2 | 5/2004 | Odell |
| 6,738,432 B2 | 5/2004 | Pehlke et al. |
| 6,759,766 B2 | 7/2004 | Hiratsuka et al. |
| 6,791,298 B2 | 9/2004 | Shenai et al. |
| 6,798,177 B1 | 9/2004 | Liu et al. |
| 6,906,567 B2 | 6/2005 | Culler |
| 6,927,441 B2 | 8/2005 | Pappalardo et al. |
| 6,934,167 B2 | 8/2005 | Jang et al. |
| 6,980,045 B1 | 12/2005 | Liu |
| 6,980,181 B2 | 12/2005 | Sudo |
| 6,995,995 B2 | 2/2006 | Zeng et al. |
| 7,009,858 B2 | 3/2006 | Umeda et al. |
| 7,071,660 B2 | 7/2006 | Xu et al. |
| 7,072,195 B2 | 7/2006 | Xu |
| 7,091,778 B2 | 8/2006 | Gan et al. |
| 7,103,114 B1 | 9/2006 | Lapierre |
| 7,135,847 B2 | 11/2006 | Taurand |
| 7,145,382 B2 | 12/2006 | Ker et al. |
| 7,157,956 B2 | 1/2007 | Wei |
| 7,161,816 B2 | 1/2007 | Shteynberg et al. |
| 7,190,210 B2 | 3/2007 | Azrai et al. |
| 7,224,062 B2 | 5/2007 | Hsu |
| 7,236,542 B2 | 6/2007 | Matero |
| 7,239,194 B2 | 7/2007 | Azrai et al. |
| 7,250,810 B1 | 7/2007 | Tsen et al. |

(56) References Cited

U.S. PATENT DOCUMENTS

| | | |
|---|---|---|
| 7,259,974 B2 | 8/2007 | Donaldson et al. |
| 7,269,036 B2 | 9/2007 | Deng et al. |
| 7,330,070 B2 | 2/2008 | Vaisanen |
| 7,362,251 B2 | 4/2008 | Jensen et al. |
| 7,365,523 B2 | 4/2008 | Malherbe et al. |
| 7,375,992 B2 | 5/2008 | Mok et al. |
| 7,382,113 B2 | 6/2008 | Wai et al. |
| 7,382,634 B2 | 6/2008 | Buchmann |
| 7,397,677 B1 | 7/2008 | Collins et al. |
| 7,400,118 B1 | 7/2008 | Zhang et al. |
| 7,408,330 B1 | 8/2008 | Zhao |
| 7,436,239 B2 | 10/2008 | Masuko et al. |
| 7,443,705 B2 | 10/2008 | Ito |
| 7,511,978 B2 | 3/2009 | Chen et al. |
| 7,521,914 B2 | 4/2009 | Dickerson et al. |
| 7,535,133 B2 | 5/2009 | Perreault et al. |
| 7,545,127 B2 | 6/2009 | Takahashi et al. |
| 7,589,605 B2 | 9/2009 | Perreault et al. |
| 7,595,682 B2 | 9/2009 | Lin et al. |
| 7,595,683 B1 | 9/2009 | Floyd |
| 7,616,467 B2 | 11/2009 | Mallwitz |
| 7,633,778 B2 | 12/2009 | Mok et al. |
| 7,642,797 B2 | 1/2010 | Kojima et al. |
| 7,656,740 B2 | 2/2010 | Yu et al. |
| 7,659,760 B2 | 2/2010 | Doi |
| 7,679,429 B2 | 3/2010 | Nakamura |
| 7,679,430 B2 | 3/2010 | Fort et al. |
| 7,696,735 B2 | 4/2010 | Oraw et al. |
| 7,705,672 B1 | 4/2010 | Rodriguez |
| 7,705,681 B2 | 4/2010 | Ilkov |
| 7,724,551 B2 | 5/2010 | Yanagida et al. |
| 7,746,041 B2 | 6/2010 | Xu et al. |
| 7,768,800 B2 | 8/2010 | Mazumder et al. |
| 7,777,459 B2 | 8/2010 | Williams |
| 7,782,027 B2 | 8/2010 | Williams |
| 7,786,712 B2 | 8/2010 | Williams |
| 7,807,499 B2 | 10/2010 | Nishizawa |
| 7,808,324 B1 | 10/2010 | Woodford et al. |
| 7,812,579 B2 | 10/2010 | Williams |
| 7,889,519 B2 | 2/2011 | Perreault et al. |
| 7,907,429 B2 | 3/2011 | Ramadass et al. |
| 7,907,430 B2 | 3/2011 | Kularatna et al. |
| 7,928,705 B2 | 4/2011 | Hooijschuur et al. |
| 7,940,038 B2 | 5/2011 | Da Silva et al. |
| 7,944,276 B2 | 5/2011 | Nakai |
| 7,952,418 B2 | 5/2011 | McDonald et al. |
| 7,956,572 B2 | 6/2011 | Zane et al. |
| 7,956,673 B2 | 6/2011 | Pan |
| 7,977,921 B2 | 7/2011 | Bahai et al. |
| 7,977,927 B2 | 7/2011 | Williams |
| 7,999,601 B2 | 8/2011 | Schlueter et al. |
| 8,000,117 B2 | 8/2011 | Petricek |
| 8,018,216 B2 | 9/2011 | Kakehi |
| 8,026,763 B2 | 9/2011 | Dawson et al. |
| 8,031,003 B2 | 10/2011 | Dishop |
| 8,035,148 B2 | 10/2011 | Goldstein |
| 8,040,174 B2 | 10/2011 | Likhterov |
| 8,048,766 B2 | 11/2011 | Joly et al. |
| 8,076,915 B2 | 12/2011 | Nakazawa |
| 8,085,524 B2 | 12/2011 | Roozeboom |
| 8,089,788 B2 | 1/2012 | Jain |
| 8,102,157 B2 | 1/2012 | Abe |
| 8,106,597 B2 | 1/2012 | Mednik |
| 8,111,052 B2 | 2/2012 | Glovinsky |
| 8,111,054 B2 | 2/2012 | Yen et al. |
| 8,130,518 B2 | 3/2012 | Fishman |
| 8,154,333 B2 | 4/2012 | Ker et al. |
| 8,159,091 B2 | 4/2012 | Yeates |
| 8,164,369 B2 | 4/2012 | Raghunathan et al. |
| 8,164,384 B2 | 4/2012 | Dawson et al. |
| 8,169,797 B2 | 5/2012 | Coccia et al. |
| 8,193,604 B2 | 6/2012 | Lin et al. |
| 8,212,541 B2 | 7/2012 | Perreault et al. |
| 8,248,045 B2 | 8/2012 | Shiu |
| 8,248,054 B2 | 8/2012 | Tong |
| 8,274,322 B2 | 9/2012 | Chang et al. |
| 8,276,002 B2 | 9/2012 | Dennard |
| 8,330,436 B2 | 12/2012 | Oraw et al. |
| 8,339,102 B2 | 12/2012 | Kushnarenko et al. |
| 8,339,184 B2 | 12/2012 | Kok et al. |
| 8,350,549 B2 | 1/2013 | Kitabatake |
| 8,354,828 B2 | 1/2013 | Huang |
| 8,384,467 B1 | 2/2013 | O'Keeffe et al. |
| 8,395,914 B2 | 3/2013 | Klootwijk |
| 8,423,800 B2 | 4/2013 | Huang et al. |
| 8,436,674 B1 | 5/2013 | Standley et al. |
| 8,451,053 B2 | 5/2013 | Perreault et al. |
| 8,456,874 B2 | 6/2013 | Singer |
| 8,503,203 B1 | 8/2013 | Szczeszynski et al. |
| 8,515,361 B2 | 8/2013 | Levesque et al. |
| 8,538,355 B2 | 9/2013 | Stockert |
| 8,542,061 B2 | 9/2013 | Levesque et al. |
| 8,542,169 B2 | 9/2013 | Senda |
| 8,559,898 B2 | 10/2013 | Jones et al. |
| 8,565,694 B2 | 10/2013 | Jones et al. |
| 8,571,492 B2 | 10/2013 | Berchtold et al. |
| 8,582,333 B2 | 11/2013 | Oraw |
| 8,619,443 B2 | 12/2013 | Lumsden |
| 8,619,445 B1 | 12/2013 | Low et al. |
| 8,629,666 B2 | 1/2014 | Carroll et al. |
| 8,643,347 B2 * | 2/2014 | Giuliano ............... H02M 3/155 323/266 |
| 8,659,353 B2 | 2/2014 | Dawson et al. |
| 8,670,254 B2 | 3/2014 | Perreault et al. |
| 8,674,545 B2 | 3/2014 | Signorelli et al. |
| 8,693,224 B1 | 4/2014 | Giuliano |
| 8,699,248 B2 | 4/2014 | Giuliano et al. |
| 8,699,973 B2 | 4/2014 | Southcombe et al. |
| 8,706,063 B2 | 4/2014 | Honjo et al. |
| 8,712,349 B2 | 4/2014 | Southcombe et al. |
| 8,718,188 B2 | 5/2014 | Balteanu et al. |
| 8,723,491 B2 | 5/2014 | Giuliano |
| 8,724,353 B1 | 5/2014 | Giuliano et al. |
| 8,729,819 B2 | 5/2014 | Zhao et al. |
| 8,731,498 B2 | 5/2014 | Southcombe et al. |
| 8,737,093 B1 | 5/2014 | Baker |
| 8,743,553 B2 | 6/2014 | Giuliano |
| 8,750,539 B2 | 6/2014 | Pennock et al. |
| 8,760,219 B2 | 6/2014 | Chao |
| 8,803,492 B2 | 8/2014 | Liu |
| 8,811,920 B2 | 8/2014 | Deuchars et al. |
| 8,811,921 B2 | 8/2014 | Jones et al. |
| 8,817,501 B1 | 8/2014 | Low et al. |
| 8,824,978 B2 | 9/2014 | Briffa et al. |
| 8,829,993 B2 | 9/2014 | Briffa et al. |
| 8,830,709 B2 | 9/2014 | Perreault |
| 8,830,710 B2 | 9/2014 | Perreault et al. |
| 8,831,544 B2 | 9/2014 | Walker et al. |
| 8,842,399 B2 | 9/2014 | Jones et al. |
| 8,854,019 B1 | 10/2014 | Levesque et al. |
| 8,854,849 B2 | 10/2014 | Kobeda et al. |
| 8,856,562 B2 | 10/2014 | Huang et al. |
| 8,860,396 B2 | 10/2014 | Giuliano |
| 8,867,281 B2 | 10/2014 | Tran et al. |
| 8,874,828 B2 | 10/2014 | Fai et al. |
| 8,891,258 B2 | 11/2014 | Zhang et al. |
| 8,892,063 B2 | 11/2014 | Jones et al. |
| 8,913,967 B2 | 12/2014 | Zimlich et al. |
| 8,913,971 B2 | 12/2014 | Arkiszewski et al. |
| 8,942,650 B2 | 1/2015 | Southcombe et al. |
| 8,942,651 B2 | 1/2015 | Jones |
| 8,947,157 B2 | 2/2015 | Levesque et al. |
| 8,957,727 B2 | 2/2015 | Dawson et al. |
| 8,958,763 B2 | 2/2015 | Williams et al. |
| 8,981,836 B2 | 3/2015 | Kern et al. |
| 8,983,407 B2 | 3/2015 | Southcombe et al. |
| 8,983,409 B2 | 3/2015 | Ngo et al. |
| 8,983,410 B2 | 3/2015 | Southcombe et al. |
| 8,989,685 B2 | 3/2015 | Southcombe et al. |
| 9,008,597 B2 | 4/2015 | Levesque et al. |
| 9,030,256 B2 | 5/2015 | Jones et al. |
| 9,041,459 B2 | 5/2015 | Szczeszynski et al. |
| 9,048,787 B2 | 6/2015 | Jones et al. |
| 9,077,405 B2 | 7/2015 | Jones et al. |

(56) References Cited

U.S. PATENT DOCUMENTS

| | | |
|---|---|---|
| 9,143,032 B2 | 9/2015 | Le et al. |
| 9,143,037 B2 | 9/2015 | Giuliano |
| 9,184,701 B2 | 11/2015 | Berchtold et al. |
| 9,203,299 B2 | 12/2015 | Low et al. |
| 9,209,758 B2 | 12/2015 | Briffa et al. |
| 9,209,787 B2 | 12/2015 | Shelton et al. |
| 9,214,865 B2 | 12/2015 | Levesque et al. |
| 9,214,900 B2 | 12/2015 | Arkiszewski |
| 9,362,825 B2 | 6/2016 | Southcombe et al. |
| 9,362,826 B2 | 6/2016 | Giuliano |
| 9,374,001 B1 | 6/2016 | Subramaniam et al. |
| 9,413,257 B2 * | 8/2016 | Wang ............... H02M 3/33507 |
| 9,444,329 B2 | 9/2016 | Arno |
| 9,450,506 B2 | 9/2016 | Perreault et al. |
| 9,502,968 B2 | 11/2016 | Voss et al. |
| 9,553,550 B2 | 1/2017 | Puliafico et al. |
| 9,577,590 B2 | 2/2017 | Levesque et al. |
| 9,584,024 B2 * | 2/2017 | Manthe ............... B23K 9/093 |
| 9,601,998 B2 | 3/2017 | Le et al. |
| 9,621,138 B1 | 4/2017 | Zhang et al. |
| 9,634,577 B2 | 4/2017 | Perreault |
| 9,712,051 B2 | 7/2017 | Giuliano |
| 9,722,492 B2 | 8/2017 | Levesque et al. |
| 9,742,266 B2 | 8/2017 | Giuliano et al. |
| 9,755,672 B2 | 9/2017 | Perreault et al. |
| 9,819,283 B2 | 11/2017 | Mahdavikhah et al. |
| 9,825,545 B2 * | 11/2017 | Chen ............... H02M 3/335 |
| 9,847,712 B2 | 12/2017 | Low et al. |
| 9,847,715 B2 | 12/2017 | Giuliano et al. |
| 9,862,052 B2 * | 1/2018 | Vogel ............... H02M 7/4833 |
| 9,882,471 B2 | 1/2018 | Giuliano |
| 9,899,919 B2 | 2/2018 | Crossley et al. |
| 9,900,204 B2 | 2/2018 | Levesque et al. |
| 10,128,745 B2 * | 11/2018 | Low ............... H02M 3/07 |
| 10,243,457 B2 | 3/2019 | Puggelli et al. |
| 10,263,512 B2 | 4/2019 | Giuliano et al. |
| 10,274,987 B2 | 4/2019 | Puggelli et al. |
| 10,326,358 B2 | 6/2019 | Giuliano |
| 10,340,794 B1 * | 7/2019 | Zhang ............... H02M 3/158 |
| 10,355,593 B1 | 7/2019 | Puggelli et al. |
| 10,374,512 B2 | 8/2019 | Szczeszynski et al. |
| 10,381,924 B2 | 8/2019 | Giuliano |
| 10,389,235 B2 * | 8/2019 | Giuliano ............ H02M 3/1582 |
| 10,389,236 B1 * | 8/2019 | Low ............... H02M 3/156 |
| 10,389,244 B2 | 8/2019 | Le et al. |
| 10,404,162 B2 | 9/2019 | Giuliano |
| 10,411,490 B2 | 9/2019 | Melgar et al. |
| 10,476,395 B2 * | 11/2019 | Dai ............... H02M 1/0845 |
| 10,523,039 B2 | 12/2019 | Melgar et al. |
| 10,541,603 B2 | 1/2020 | Puggelli et al. |
| 10,549,373 B2 * | 2/2020 | Madsen ............... H02M 7/5387 |
| 10,601,311 B2 | 3/2020 | Meyvaert et al. |
| 10,601,324 B1 * | 3/2020 | Kudva ............... H02M 3/1588 |
| 10,644,590 B2 | 5/2020 | Giuliano et al. |
| 10,666,134 B2 | 5/2020 | Low et al. |
| 10,673,335 B2 | 6/2020 | Le et al. |
| 10,680,515 B2 * | 6/2020 | Giuliano ............... H02M 3/07 |
| 10,686,367 B1 * | 6/2020 | Low ............... H02M 1/36 |
| 10,686,380 B2 | 6/2020 | Giuliano |
| 10,693,387 B2 * | 6/2020 | Nakahata ............... H02M 5/06 |
| 10,715,035 B2 | 7/2020 | Li et al. |
| 10,720,832 B2 | 7/2020 | Meyvaert et al. |
| 10,756,624 B2 * | 8/2020 | Mauri ............... H02M 3/158 |
| 10,756,643 B2 * | 8/2020 | Chen ............... H10N 30/802 |
| 10,770,976 B2 | 9/2020 | Giuliano et al. |
| 10,833,579 B1 * | 11/2020 | Puggelli ............... G06F 1/26 |
| 10,926,649 B2 * | 2/2021 | Nagashima ............ H02J 3/322 |
| 11,264,895 B2 | 3/2022 | Giuliano et al. |
| 11,342,844 B1 | 5/2022 | Meyvaert |
| 11,515,784 B2 | 11/2022 | Meyvaert |
| 11,817,778 B2 * | 11/2023 | Giuliano ............... H02M 1/42 |
| 2002/0008567 A1 | 1/2002 | Henry |
| 2002/0130704 A1 | 9/2002 | Myono et al. |
| 2002/0158660 A1 | 10/2002 | Jang et al. |
| 2003/0038669 A1 | 2/2003 | Zhang |
| 2003/0058665 A1 | 3/2003 | Kobayashi et al. |
| 2003/0151449 A1 | 8/2003 | Nakagawa et al. |
| 2003/0169096 A1 | 9/2003 | Hsu et al. |
| 2003/0169896 A1 | 9/2003 | Kirk, III et al. |
| 2003/0227280 A1 | 12/2003 | Vinciarelli |
| 2004/0041620 A1 | 3/2004 | D'Angelo et al. |
| 2004/0080964 A1 | 4/2004 | Buchmann |
| 2004/0095787 A1 | 5/2004 | Donaldson et al. |
| 2004/0170030 A1 | 9/2004 | Duerbaum et al. |
| 2004/0222775 A1 | 11/2004 | Muramatsu et al. |
| 2004/0246044 A1 | 12/2004 | Myono et al. |
| 2005/0007184 A1 | 1/2005 | Kamijo |
| 2005/0024125 A1 | 2/2005 | McNitt et al. |
| 2005/0068073 A1 | 3/2005 | Shi et al. |
| 2005/0088865 A1 | 4/2005 | Lopez et al. |
| 2005/0102798 A1 | 5/2005 | Kato |
| 2005/0136873 A1 | 6/2005 | Kim et al. |
| 2005/0169021 A1 | 8/2005 | Itoh |
| 2005/0207133 A1 | 9/2005 | Pavier et al. |
| 2005/0213267 A1 | 9/2005 | Azrai et al. |
| 2005/0254272 A1 | 11/2005 | Vinciarelli |
| 2005/0285767 A1 | 12/2005 | Wang et al. |
| 2005/0286278 A1 | 12/2005 | Perreault et al. |
| 2006/0139021 A1 | 6/2006 | Taurand |
| 2006/0186947 A1 | 8/2006 | Lin et al. |
| 2006/0213890 A1 * | 9/2006 | Kooken ............... B23K 9/095<br>219/130.21 |
| 2006/0226130 A1 * | 10/2006 | Kooken ............... H02M 3/1584<br>219/130.1 |
| 2007/0018700 A1 | 1/2007 | Yen et al. |
| 2007/0035973 A1 | 2/2007 | Kitazaki et al. |
| 2007/0035977 A1 | 2/2007 | Odell |
| 2007/0051712 A1 * | 3/2007 | Kooken ............... B23K 9/1043<br>219/130.1 |
| 2007/0066224 A1 | 3/2007 | d'Hont et al. |
| 2007/0066250 A1 | 3/2007 | Takahashi et al. |
| 2007/0069818 A1 | 3/2007 | Bhatti et al. |
| 2007/0091655 A1 | 4/2007 | Oyama et al. |
| 2007/0123184 A1 | 5/2007 | Nesimoglu et al. |
| 2007/0146020 A1 | 6/2007 | Williams |
| 2007/0146052 A1 | 6/2007 | Byeon |
| 2007/0146090 A1 | 6/2007 | Carey et al. |
| 2007/0159257 A1 | 7/2007 | Lee et al. |
| 2007/0171680 A1 | 7/2007 | Perreault et al. |
| 2007/0182368 A1 | 8/2007 | Yang |
| 2007/0210774 A1 | 9/2007 | Kimura et al. |
| 2007/0230221 A1 | 10/2007 | Lim et al. |
| 2007/0247222 A1 | 10/2007 | Sorrells et al. |
| 2007/0247253 A1 | 10/2007 | Carey et al. |
| 2007/0281635 A1 | 12/2007 | McCallister et al. |
| 2007/0290747 A1 | 12/2007 | Traylor et al. |
| 2007/0291718 A1 | 12/2007 | Chan et al. |
| 2007/0296383 A1 | 12/2007 | Xu et al. |
| 2008/0001660 A1 | 1/2008 | Rasmussen |
| 2008/0003960 A1 | 1/2008 | Zolfaghari |
| 2008/0003962 A1 | 1/2008 | Ngai |
| 2008/0007333 A1 | 1/2008 | Lee et al. |
| 2008/0008273 A1 | 1/2008 | Kim et al. |
| 2008/0009248 A1 | 1/2008 | Rozenblit et al. |
| 2008/0012637 A1 | 1/2008 | Aridas et al. |
| 2008/0013236 A1 | 1/2008 | Weng |
| 2008/0019459 A1 | 1/2008 | Chen et al. |
| 2008/0024198 A1 | 1/2008 | Bitonti et al. |
| 2008/0031023 A1 | 2/2008 | Kitagawa et al. |
| 2008/0051044 A1 | 2/2008 | Takehara |
| 2008/0055946 A1 | 3/2008 | Lesso et al. |
| 2008/0062724 A1 | 3/2008 | Feng et al. |
| 2008/0136500 A1 | 6/2008 | Frulio et al. |
| 2008/0136559 A1 | 6/2008 | Takahashi et al. |
| 2008/0136991 A1 | 6/2008 | Senda |
| 2008/0150619 A1 | 6/2008 | Lesso et al. |
| 2008/0150621 A1 | 6/2008 | Lesso et al. |
| 2008/0157732 A1 | 7/2008 | Williams |
| 2008/0157733 A1 | 7/2008 | Williams |
| 2008/0158915 A1 | 7/2008 | Williams |
| 2008/0186081 A1 | 8/2008 | Yamahira et al. |
| 2008/0231233 A1 | 9/2008 | Thornton |
| 2008/0233913 A1 | 9/2008 | Sivasubramaniam |
| 2008/0239772 A1 | 10/2008 | Oraw et al. |

(56) References Cited

U.S. PATENT DOCUMENTS

| | | |
|---|---|---|
| 2008/0266917 A1 | 10/2008 | Lin et al. |
| 2008/0284398 A1 | 11/2008 | Qiu et al. |
| 2009/0004981 A1 | 1/2009 | Eliezer et al. |
| 2009/0033289 A1 | 2/2009 | Xing et al. |
| 2009/0033293 A1 | 2/2009 | Xing et al. |
| 2009/0039843 A1 | 2/2009 | Kudo |
| 2009/0059630 A1 | 3/2009 | Williams |
| 2009/0066407 A1 | 3/2009 | Bowman et al. |
| 2009/0072800 A1 | 3/2009 | Ramadass et al. |
| 2009/0102439 A1 | 4/2009 | Williams |
| 2009/0147554 A1 | 6/2009 | Adest et al. |
| 2009/0174383 A1 | 7/2009 | Tsui et al. |
| 2009/0176464 A1 | 7/2009 | Liang et al. |
| 2009/0196082 A1 | 8/2009 | Mazumder et al. |
| 2009/0206804 A1 | 8/2009 | Xu et al. |
| 2009/0225012 A1 | 9/2009 | Choi |
| 2009/0230934 A1 | 9/2009 | Hooijschuur et al. |
| 2009/0257211 A1 | 10/2009 | Kontani et al. |
| 2009/0273955 A1 | 11/2009 | Tseng et al. |
| 2009/0278520 A1* | 11/2009 | Perreault .......... H02M 3/07 323/282 |
| 2009/0302686 A1 | 12/2009 | Fishman |
| 2009/0303753 A1 | 12/2009 | Fu et al. |
| 2009/0309566 A1 | 12/2009 | Shiu |
| 2009/0311980 A1 | 12/2009 | Sjoland |
| 2009/0322304 A1 | 12/2009 | Oraw et al. |
| 2009/0322414 A1 | 12/2009 | Oraw et al. |
| 2009/0323380 A1 | 12/2009 | Harrison |
| 2010/0013548 A1 | 1/2010 | Barrow |
| 2010/0027596 A1 | 2/2010 | Bellaouar et al. |
| 2010/0060326 A1 | 3/2010 | Palmer et al. |
| 2010/0073084 A1 | 3/2010 | Hur et al. |
| 2010/0085786 A1 | 4/2010 | Chiu et al. |
| 2010/0097104 A1 | 4/2010 | Yang et al. |
| 2010/0110741 A1 | 5/2010 | Lin et al. |
| 2010/0117612 A1 | 5/2010 | Klootwijk et al. |
| 2010/0117700 A1 | 5/2010 | Raghunathan et al. |
| 2010/0117719 A1 | 5/2010 | Matano |
| 2010/0118458 A1 | 5/2010 | Coffey |
| 2010/0120475 A1 | 5/2010 | Taniuchi et al. |
| 2010/0123447 A1 | 5/2010 | Vecera et al. |
| 2010/0140736 A1 | 6/2010 | Lin et al. |
| 2010/0142239 A1 | 6/2010 | Hopper |
| 2010/0156370 A1 | 6/2010 | Tseng et al. |
| 2010/0164579 A1 | 7/2010 | Acatrinei |
| 2010/0176869 A1 | 7/2010 | Horie et al. |
| 2010/0201441 A1 | 8/2010 | Gustavsson |
| 2010/0202161 A1 | 8/2010 | Sims et al. |
| 2010/0205614 A1 | 8/2010 | Harrington |
| 2010/0214746 A1 | 8/2010 | Lotfi et al. |
| 2010/0237833 A1 | 9/2010 | Abe |
| 2010/0244189 A1 | 9/2010 | Klootwijk et al. |
| 2010/0244585 A1 | 9/2010 | Tan et al. |
| 2010/0244935 A1 | 9/2010 | Kim et al. |
| 2010/0291888 A1 | 11/2010 | Hadjichristos et al. |
| 2010/0308751 A1 | 12/2010 | Nerone |
| 2010/0321041 A1 | 12/2010 | Feldtkeller |
| 2011/0001542 A1 | 1/2011 | Ranta et al. |
| 2011/0026275 A1 | 2/2011 | Huang et al. |
| 2011/0050325 A1 | 3/2011 | Schatzberger et al. |
| 2011/0051476 A1 | 3/2011 | Manor et al. |
| 2011/0062940 A1 | 3/2011 | Shvartsman |
| 2011/0089483 A1 | 4/2011 | Reynes et al. |
| 2011/0101884 A1 | 5/2011 | Kim et al. |
| 2011/0101938 A1 | 5/2011 | Ma et al. |
| 2011/0115550 A1 | 5/2011 | Pelley |
| 2011/0148385 A1 | 6/2011 | North et al. |
| 2011/0148518 A1 | 6/2011 | Lejon et al. |
| 2011/0156819 A1 | 6/2011 | Kim et al. |
| 2011/0163414 A1 | 7/2011 | Lin et al. |
| 2011/0175591 A1 | 7/2011 | Cuk |
| 2011/0176335 A1 | 7/2011 | Li et al. |
| 2011/0181115 A1 | 7/2011 | Ivanov |
| 2011/0181128 A1 | 7/2011 | Perreault et al. |
| 2011/0204858 A1 | 8/2011 | Kudo |
| 2011/0236766 A1 | 9/2011 | Kolosnitsyn et al. |
| 2011/0241767 A1 | 10/2011 | Curatola et al. |
| 2011/0273151 A1 | 11/2011 | Lesso et al. |
| 2011/0304310 A1 | 12/2011 | Sotono |
| 2012/0014153 A1 | 1/2012 | Christoph et al. |
| 2012/0043818 A1 | 2/2012 | Stratakos et al. |
| 2012/0050137 A1 | 3/2012 | Hellenthal et al. |
| 2012/0064953 A1 | 3/2012 | Dagher et al. |
| 2012/0075891 A1 | 3/2012 | Zhang et al. |
| 2012/0105137 A1 | 5/2012 | Kok et al. |
| 2012/0119718 A1 | 5/2012 | Song |
| 2012/0126909 A1 | 5/2012 | McCune, Jr. |
| 2012/0139515 A1 | 6/2012 | Li |
| 2012/0146177 A1 | 6/2012 | Choi et al. |
| 2012/0146451 A1 | 6/2012 | Nitta |
| 2012/0153907 A1 | 6/2012 | Carobolante et al. |
| 2012/0153912 A1 | 6/2012 | Demski et al. |
| 2012/0154023 A1 | 6/2012 | Pan et al. |
| 2012/0158188 A1 | 6/2012 | Madala |
| 2012/0170334 A1 | 7/2012 | Menegoli et al. |
| 2012/0176195 A1 | 7/2012 | Dawson et al. |
| 2012/0200340 A1 | 8/2012 | Shook et al. |
| 2012/0212201 A1 | 8/2012 | Lee et al. |
| 2012/0223773 A1 | 9/2012 | Jones et al. |
| 2012/0243267 A1 | 9/2012 | Kassayan |
| 2012/0249096 A1 | 10/2012 | Enenkel |
| 2012/0249224 A1 | 10/2012 | Wei et al. |
| 2012/0250360 A1 | 10/2012 | Orr et al. |
| 2012/0252382 A1 | 10/2012 | Bashir et al. |
| 2012/0268030 A1 | 10/2012 | Riesebosch |
| 2012/0313602 A1 | 12/2012 | Perreault et al. |
| 2012/0326684 A1 | 12/2012 | Perreault et al. |
| 2013/0005286 A1 | 1/2013 | Chan et al. |
| 2013/0044519 A1 | 2/2013 | Teraura et al. |
| 2013/0049714 A1 | 2/2013 | Chiu |
| 2013/0049885 A1 | 2/2013 | Rozman et al. |
| 2013/0058049 A1 | 3/2013 | Roth et al. |
| 2013/0058141 A1 | 3/2013 | Oraw |
| 2013/0069614 A1 | 3/2013 | Tso et al. |
| 2013/0094157 A1* | 4/2013 | Giuliano .......... H01L 23/642 361/748 |
| 2013/0106380 A1* | 5/2013 | Marsili .......... H02M 3/07 323/283 |
| 2013/0154491 A1 | 6/2013 | Hawley |
| 2013/0154600 A1 | 6/2013 | Giuliano |
| 2013/0163302 A1 | 6/2013 | Li et al. |
| 2013/0163392 A1 | 6/2013 | Braunberger |
| 2013/0181521 A1 | 7/2013 | Khlat |
| 2013/0181752 A1* | 7/2013 | Chen .......... H03K 3/012 327/111 |
| 2013/0187612 A1 | 7/2013 | Aiura |
| 2013/0201729 A1 | 8/2013 | Ahsanuzzaman |
| 2013/0229841 A1* | 9/2013 | Giuliano .......... H02M 1/0095 363/60 |
| 2013/0234785 A1* | 9/2013 | Dai .......... H02M 3/07 327/536 |
| 2013/0241625 A1 | 9/2013 | Perreault et al. |
| 2013/0245487 A1 | 9/2013 | Aga |
| 2013/0279224 A1 | 10/2013 | Ofek |
| 2013/0287231 A1 | 10/2013 | Kropfitsch |
| 2013/0293310 A1 | 11/2013 | Levesque et al. |
| 2013/0313904 A1 | 11/2013 | Kayama |
| 2013/0322126 A1 | 12/2013 | Pan et al. |
| 2013/0343106 A1 | 12/2013 | Perreault et al. |
| 2013/0343107 A1 | 12/2013 | Perreault |
| 2014/0015731 A1 | 1/2014 | Khlat et al. |
| 2014/0022005 A1 | 1/2014 | Ramanan et al. |
| 2014/0070787 A1 | 3/2014 | Arno |
| 2014/0091773 A1 | 4/2014 | Burlingame et al. |
| 2014/0092643 A1 | 4/2014 | Luccato |
| 2014/0118065 A1 | 5/2014 | Briffa et al. |
| 2014/0118072 A1 | 5/2014 | Briffa et al. |
| 2014/0120854 A1 | 5/2014 | Briffa et al. |
| 2014/0167513 A1 | 6/2014 | Chang et al. |
| 2014/0167722 A1 | 6/2014 | Lee |
| 2014/0167853 A1 | 6/2014 | Haruna et al. |
| 2014/0177300 A1 | 6/2014 | Lagorce et al. |
| 2014/0184177 A1 | 7/2014 | Tournatory et al. |
| 2014/0266132 A1 | 9/2014 | Low et al. |

(56) References Cited

U.S. PATENT DOCUMENTS

| | | | |
|---|---|---|---|
| 2014/0268945 A1 | 9/2014 | Low et al. | |
| 2014/0313781 A1 | 10/2014 | Perreault et al. | |
| 2014/0339918 A1 | 11/2014 | Perreault et al. | |
| 2014/0355322 A1 | 12/2014 | Perreault et al. | |
| 2015/0002195 A1 | 1/2015 | Englekirk | |
| 2015/0023063 A1 | 1/2015 | Perreault et al. | |
| 2015/0077175 A1 | 3/2015 | Giuliano et al. | |
| 2015/0077176 A1 | 3/2015 | Szczeszynski et al. | |
| 2015/0084701 A1* | 3/2015 | Perreault | H03F 3/2178 330/297 |
| 2015/0102798 A1* | 4/2015 | Giuliano | H02M 3/158 323/312 |
| 2015/0155895 A1* | 6/2015 | Perreault | H02M 3/07 330/297 |
| 2015/0255547 A1 | 9/2015 | Yuan et al. | |
| 2015/0295497 A1 | 10/2015 | Perreault et al. | |
| 2015/0318851 A1 | 11/2015 | Roberts et al. | |
| 2015/0364991 A1* | 12/2015 | Chung | H02M 1/44 323/301 |
| 2016/0028302 A1 | 1/2016 | Low et al. | |
| 2016/0094126 A1* | 3/2016 | Liu | H03K 7/06 455/73 |
| 2016/0197552 A1* | 7/2016 | Giuliano | H02M 3/07 363/60 |
| 2017/0214408 A1* | 7/2017 | Liang | H03L 7/099 |
| 2017/0244318 A1* | 8/2017 | Giuliano | H02M 3/07 |
| 2017/0279374 A1* | 9/2017 | Friebe | H02M 7/537 |
| 2017/0300078 A1* | 10/2017 | Puggelli | G05F 5/00 |
| 2017/0302093 A1* | 10/2017 | Petersen | H02M 7/4837 |
| 2018/0197673 A1* | 7/2018 | Njiende | H01F 3/10 |
| 2018/0205315 A1* | 7/2018 | Giuliano | H02M 3/158 |
| 2019/0027468 A1* | 1/2019 | Giuliano | H01L 23/5223 |
| 2019/0028018 A1* | 1/2019 | Datta | H02M 1/08 |
| 2019/0115830 A1* | 4/2019 | Giuliano | H02M 3/158 |
| 2019/0207513 A1* | 7/2019 | Ramadass | H02M 7/219 |
| 2020/0021187 A1* | 1/2020 | Chang | H02M 3/07 |
| 2020/0036286 A1* | 1/2020 | Giuliano | H02M 1/42 |
| 2020/0083805 A1* | 3/2020 | Mauri | H02M 3/07 |
| 2020/0083814 A1* | 3/2020 | Choi | H02M 3/158 |
| 2020/0136494 A1* | 4/2020 | Kazama | H02M 3/158 |
| 2020/0195136 A1* | 6/2020 | Huang | H02M 3/07 |
| 2020/0204172 A1* | 6/2020 | Geng | H03K 17/284 |
| 2020/0246626 A1* | 8/2020 | Labbe | A61N 1/3615 |
| 2020/0253520 A1* | 8/2020 | Wang | A61B 5/002 |
| 2022/0131466 A1* | 4/2022 | Giuliano | H02M 1/0043 |
| 2022/0140727 A1* | 5/2022 | Giuliano | H02M 1/42 307/31 |
| 2022/0224229 A1* | 7/2022 | Giuliano | H02M 3/1582 |

FOREIGN PATENT DOCUMENTS

| | | | |
|---|---|---|---|
| CN | 1057410 C | 10/2000 | |
| CN | 1452306 A | 10/2003 | |
| CN | 1483204 A | 3/2004 | |
| CN | 1728518 A | 2/2006 | |
| CN | 1761136 A | 4/2006 | |
| CN | 101071981 A | 5/2006 | |
| CN | 1825485 A | 8/2006 | |
| CN | 1988349 A | 6/2007 | |
| CN | 101009433 A | 8/2007 | |
| CN | 101034536 A | 9/2007 | |
| CN | 101079576 A | 11/2007 | |
| CN | 101174789 A | 5/2008 | |
| CN | 101286696 A | 10/2008 | |
| CN | 101297465 A | 10/2008 | |
| CN | 101399496 A | 4/2009 | |
| CN | 101447753 A | 6/2009 | |
| CN | 101563845 A | 10/2009 | |
| CN | 101588135 A | 11/2009 | |
| CN | 101611531 A | 12/2009 | |
| CN | 101636702 A | 1/2010 | |
| CN | 101647181 A | 2/2010 | |
| CN | 101647182 A | 2/2010 | |
| CN | 101662208 A | 3/2010 | |
| CN | 101707437 A | 5/2010 | |
| CN | 101765963 A | 6/2010 | |
| CN | 101931204 A | 12/2010 | |
| CN | 101976953 A | 2/2011 | |
| CN | 101997406 A | 3/2011 | |
| CN | 102055328 A | 5/2011 | |
| CN | 102118130 A | 7/2011 | |
| CN | 102171918 A | 8/2011 | |
| CN | 102185484 A | 9/2011 | |
| CN | 102210102 A | 10/2011 | |
| CN | 102480291 A | 5/2012 | |
| CN | 102769986 A | 11/2012 | |
| CN | 102904436 A | 1/2013 | |
| CN | 103178711 A | 6/2013 | |
| CN | 103208862 A * | 7/2013 | ............ H03K 3/012 |
| CN | 103275753 A | 9/2013 | |
| CN | 103636288 A | 3/2014 | |
| CN | 103650313 A | 3/2014 | |
| CN | 103650313 B | 3/2014 | |
| CN | 103650314 A | 3/2014 | |
| CN | 103975433 A | 8/2014 | |
| CN | 104011985 | 8/2014 | |
| CN | 104011985 A | 8/2014 | |
| CN | 105229908 | 1/2016 | |
| CN | 105229908 A | 1/2016 | |
| CN | 108964442 A | 12/2018 | |
| CN | 110277908 | 9/2019 | |
| CN | 115580109 | 1/2023 | |
| DE | 2705597 A1 | 8/1977 | |
| DE | 3347106 A1 | 7/1985 | |
| DE | 10358299 A1 | 7/2005 | |
| DE | 112012005353 | 10/2014 | |
| DE | 112013006828 T5 | 3/2016 | |
| EP | 0513920 A2 | 11/1992 | |
| EP | 0773622 A2 | 5/1997 | |
| EP | 1199788 A1 | 4/2002 | |
| EP | 1635444 B1 | 3/2006 | |
| EP | 1750366 A2 | 2/2007 | |
| EP | 2469694 A1 | 6/2012 | |
| EP | 2705597 A2 | 3/2014 | |
| EP | 2705597 B1 | 8/2018 | |
| EP | 3425784 A1 | 1/2019 | |
| FR | 2852748 A1 | 9/2004 | |
| GB | 2232830 A | 12/1990 | |
| GB | 2505371 A | 2/2014 | |
| GB | 2512259 | 9/2014 | |
| GB | 2526492 | 11/2015 | |
| GB | 2526492 A | 11/2015 | |
| GB | 2587732 | 4/2021 | |
| GB | 2588878 | 5/2021 | |
| GB | 2589040 | 5/2021 | |
| JP | H05191970 A | 7/1993 | |
| JP | H0787682 A | 3/1995 | |
| JP | 09135567 A | 5/1997 | |
| JP | 10327573 A | 12/1998 | |
| JP | 10327575 A | 12/1998 | |
| JP | H10327573 A | 12/1998 | |
| JP | H10327575 A | 12/1998 | |
| JP | 11235053 A | 8/1999 | |
| JP | H11235053 A | 8/1999 | |
| JP | 2000060110 A | 2/2000 | |
| JP | 2000134095 A | 5/2000 | |
| JP | 2002062858 A | 2/2002 | |
| JP | 2002506609 A | 2/2002 | |
| JP | 2002233139 A | 8/2002 | |
| JP | 2002305248 A | 10/2002 | |
| JP | 2003284324 A | 10/2003 | |
| JP | 3475688 B2 | 12/2003 | |
| JP | 2004187355 A | 7/2004 | |
| JP | 2006025592 A | 1/2006 | |
| JP | 2006050833 A | 2/2006 | |
| JP | 2006067783 A | 3/2006 | |
| JP | 2007215320 A | 8/2007 | |
| JP | 2008118517 A | 5/2008 | |
| JP | 2008220001 A | 9/2008 | |
| JP | 2009022093 A | 1/2009 | |
| JP | 2009513098 A | 3/2009 | |
| JP | 2009165227 A | 7/2009 | |
| JP | 2010045943 A | 2/2010 | |

(56) References Cited

FOREIGN PATENT DOCUMENTS

| | | | | |
|---|---|---|---|---|
| JP | 2010521943 A | 6/2010 | | |
| JP | 2012157211 A | 8/2012 | | |
| JP | 2013034298 A | 2/2013 | | |
| JP | 2013065939 A | 4/2013 | | |
| JP | 5297116 B2 | 9/2013 | | |
| JP | 2014212654 A | 11/2014 | | |
| KR | 1019990002891 A | 1/1999 | | |
| KR | 20000052068 A | 8/2000 | | |
| KR | 1020100023304 A | 3/2010 | | |
| KR | 1020100138146 A | 12/2010 | | |
| KR | 1020110053681 A | 5/2011 | | |
| KR | 1020110061121 A | 6/2011 | | |
| KR | 1020120010636 A | 2/2012 | | |
| KR | 1020130066266 A | 6/2013 | | |
| KR | 1020140015528 A | 2/2014 | | |
| KR | 1020140033577 A | 3/2014 | | |
| KR | 1020140103351 | 8/2014 | | |
| KR | 1020150085072 A | 7/2015 | | |
| KR | 101556838 B1 | 10/2015 | | |
| KR | 1020150132530 | 11/2015 | | |
| KR | 1020200077607 | 6/2020 | | |
| KR | 20220098263 | 7/2022 | | |
| TW | 200701608 A | 1/2007 | | |
| WO | WO2004047303 A1 | 6/2004 | | |
| WO | WO2004047303 A8 | 6/2004 | | |
| WO | WO2006093600 A2 | 9/2006 | | |
| WO | WO2007136919 A2 | 11/2007 | | |
| WO | WO2009012900 A1 | 1/2009 | | |
| WO | WO2009112900 A1 | 9/2009 | | |
| WO | WO2010056912 A1 | 5/2010 | | |
| WO | WO2011089483 A1 | 7/2011 | | |
| WO | WO2012085598 A2 | 6/2012 | | |
| WO | WO-2012151466 A2 * | 11/2012 | ........... | H01L 23/481 |
| WO | WO2012151466 A3 | 2/2013 | | |
| WO | WO2013059446 A1 | 4/2013 | | |
| WO | WO2013086445 A1 | 6/2013 | | |
| WO | WO2013096416 | 6/2013 | | |
| WO | WO2013096416 A1 | 6/2013 | | |
| WO | WO2014070998 A1 | 5/2014 | | |
| WO | WO2014143366 | 9/2014 | | |
| WO | WO2014143366 A1 | 9/2014 | | |
| WO | WO-2017161368 A1 * | 9/2017 | ........... | H02M 1/007 |

OTHER PUBLICATIONS

U.S. Appl. No. 61/417,633, Chris Levesque et al., filed Nov. 29, 2010.
T. A. Meynard, H. Foch, "Multi-Level Conversion: High Voltage Choppers and Voltage-Source Inverters," IEEE Power Electronics Specialists Conference, pp. 397-403, 1992.
Markowski, "Performance Limits of Switched-Capacitor DC-DC Converters", IEEE PESC'95 Conference, 1995.
Linear Technology data sheet for part LTC3402, "2A, 3MHz Micropower Synchronous Boost Converter", 2000.
Ottman et al, "Optimized Piezoelectric Energy Harvesting Circuit using Step-Down Converter in Discontinuous Conduction Mode", IEEE Power Electronics Specialists Conference, pp. 1988-1994, 2002.
Andreassen—"Digital Variable Frequency Control for Zero Voltage Switching and Interleaving of Synchronous Buck Converters" 12th Intl. Power Electronics and Motion Control Conference, IEEE Aug. 2006, pp. 184-188, 5 pages, Doc 7043.
Pilawa-Podgurski et al. "Merged Two-Stage Power Converter Architecture with Soft Charging Switched-Capacitor Energy Transfer" 39th IEEE Power Electronics Specialists Conference, 2008, pp. 4008-4015.
Xiaoguo Liang et al, Evaluation of Narrow Vdc-Based Power Delivery Architecture in Mobile Computing System, IEEE Transactions on Industry Applications., Nov. 1, 2011, IEEE Service Center, Piscataway, NJ., US.
Xiaoguo Liang et al., "Evaluation of Narrow Vdc-Based Power Delivery Architecture in Mobile Computing System," IEEE Transactions on Industry Applications, vol. 47, No. 6: pp. 2539-2548 (Dec. 1, 2011).
Ma et al, "Design and Optimization of Dynamic Power System for Self-Powered Integrated Wireless Sensing Nodes" ACM ISLPED '05 conference (published at pp. 303-306 of the proceedings).
Texas Instruments data sheet for part TPS54310, "3-V to 6-V input, 3-A output synchronous-buck PWM switcher with integrated FETs", dated 2002-2005.
Wai-Shan Ng, et. al., "Switched Capacitor DC-DC Converter: Superior where the Buck Converter has Dominated", Electrical Engineering and Computer Sciences University of California at Berkeley, Technical Report No. UCB/EECS-2011-94, http://www.eecs.berkeley.edu/Pubs/TechRpts/2011/EECS-2011-94.html, Aug. 17, 2011, 141 pgs.
O. Abutbul et al. "Step-Up Switching-Mode Converter With High Voltage Gain Using a Switched-Capacitor Circuit" IEEE Transactions on Circuits and Systems I., vol. 50, pp. 1098-1102, Aug. 2003.
R. Pilawa-Podgurski and D. Perreault, "Merged Two-Stage Power Converter with Soft Charging Switched-Capacitor Stage in 180 nm CMOS," IEEE Journal of Solid-State Circuits, vol. 47, No. 7, pp. 1557-1567, Jul. 2012.
Sun—"High Power Density, High Efficiency System Two-Stage Power Architecture for Laptop Computers" Power Electronic Specialists Conference, pp. 1-7, Jun. 18, 2006, Doc 7596.
Umeno et al. "A New Approach to Low Ripple-Noise Switching Converters on the Basis of Switched-Capacitor Converters" IEEE International Symposium on Circuits and Systems, vol. 2, pp. 1077-1080, Jun. 1991.
Sun et al. "High Power Density, High Efficiency System Two-Stage Power Architecture for Laptop Computers", Power Electronics Specialists Conference, pp. 1-7, Jun. 2006.
Starzyk et al., "A DC-DC Charge Pump Design Based on Voltage Doublers," IEEE Transactions on Circuits and Systems—I. Fundamental Theory and Applications, vol. 48, No. 3, Mar. 2001, pp. 350-359.
Xu et al., "Voltage Divider and its Application in Two-stage Power Architecture," IEEE Twenty-First Annual IEEE Applied Power Electronics Conference and Exposition, pp. 499-504, Mar. 2006.
Luo—"Investigation of Switched-Capacitorized DC/DC Converters" 2009 IEEE 6th Intl. Power Electronics and Motion Control Conference, Wuhan, China, May 17-20, 2009, pp. 1270-1276, 7 pages, Doc 7050.
Cheng—"New Generation of Switched Capacitor Converters" PESC 98 Record, 29th Annual IEEE Power Electronics and Motion Control Conference, Wuhan, China, May 17-20, 2009, pp. 1529-1535, 7 pages, Doc 7049.
Cao—"Multiphase Multilevel Modular DC-DC Converter for High-Current High-Gain TEG Application" IEEE Transactions on Industry Applications, vol. 47, No. 3, May/Jun. 1991, pp. 1400-1408, 9 pages, Doc 7042.
Wood et al, "Design, Fabrication and Initial Results of a 2g Autonomous Glider" IEEE Industrial Electronics Society, pp. 1870-1877, Nov. 2005.
Han et al. "A New Approach to Reducing Output Ripple in Switched-Capacitor-Based Step-Down DC-DC Converters" IEEE Transactions on Power Electronics, vol. 21, No. 6, pp. 1548-1555 Nov. 2006.
R. D. Middlebrook, "Transformerless DC-to-DC Converters with Large Conversion Ratios" IEEE Transactions on Power Electronics, vol. 3, No. 4, pp. 484-488, Oct. 1988.
Yeung, "Multiple Fractional Voltage Conversion Ratios for Switched Capacitor Resonant Converters", Jun. 1, 2001.
David Giuliano, "Miniaturized, low-voltage power converters with fast dynamic response" Thesis (Ph. D.)—Massachusetts Institute of Technology, Department of Electrical Engineering and Computer Science, Sep. 2013.
Axelrod et al. "Single-switch single-stage switched-capacitor buck converter", Proc. of NORPIE 2004, 4th Nordic Workshop on Power and Industrial Electronics, Jun. 2004, entire document, pp. 1-5 of pdf submission.
Wood—"Design, Fabrication and Initial Results of a 2g Autonomous Glider" IEEE Industrial Electronics Society, pp. 1870-1877, Nov. 2005, Doc 7598.

(56) References Cited

OTHER PUBLICATIONS

Middlebrook—"Transformerless DC-to-DC Converters with Large Conversion Ratios" IEEE Transactions on Power Electronics, vol. 3, No. 4, pp. 484-488, Oct. 1988, Doc 7592.

Han—"A New Approach to Reducing Outpur Ripple in Switched-Capacitor-Based Step-Down DC-DC Converters" IEEE Transactions on Power Electronics, vol. 21, No. 6, pp. 1548-1555, Nov. 2006, Doc 7589.

Abutbul—"Step-Up Switching-Mode Converter with High Voltage Gain Using a Switched-Capacitor Circuit" IEEE Transactions on Circuits and Systems I, vol. 50, pp. 1098-1102, Aug. 2003, Doc 7587.

Umeno—"A New Approach to Low Ripple-Noise Switching Converters on the Basis of Switched-Capacitor Converters" IEEE Intl. Symposium on Circuits and Systems, vol. 2, pp. 1077-1080, Jun. 1991, Doc 7597.

Pilawa-Podgurski—"Merged Two-Stage Power Converter Architecture with Soft Charging Switched-Capacitor Energy Transfer" 39th IEEE Power Electronics Specialists Conference, 2008, Doc 7594.

Pilawa-Podgurski—"Merged Two-Stage Power Converter with Soft Charging Switched-Capacitor Stage in 180 nm CMOS" IEEE Journal of Solid-State Circuits, vol. 47, No. 7, pp. 1557-1567, Jul. 2012, Doc 7595.

Lei—"Analysis of Switched-Capacitor DC-DC Converters in Soft-Charging Operation" 14th IEEE Workshop on Control and Modeling for Power Electronics, p. 1-7, Jun. 23, 2013, Doc 7590.

Axelrod—"Single-switch single stage switched-capacitor buck converter", Proc. of NORPIE 2004, 4th Nordic Workshop on Power and Industrial Electronics, Jun. 2004, Doc 7588.

Meynard—"Multi-Level Conversion: High Voltage Choppers and Voltage-Source Inverters" IEEE Power Electronics Specialists Conference pp. 397-403, 1992, Doc 7591.

Cheng—"New Generation of Switched Capacitor Converters" PESC 98 Record, 29th Annual IEEE Power Electronics and Motion Control Conference, Wuhan, China, May 17-20, 2009, pp. 1529-1535, 7 pages.

Makowski, "Performance Limits of Switched-Capacitor DC-DC Converters", IEEE PESC'95 Conference, 1995.

Lei et al. "Analysis of Switched-capacitor DC-DC Converters in Soft-charging Operation" 14thIEEE Workshop on Control and Modeling for Power Electronics, pp. 1-7, Jun. 23, 2013.

Cao—"Multiphase Multilevel Modular DC-DC Converter for High-Current High-Gain TEG Application" IEEE Transactions on Industry Applications, vol. 47, No. 3, May/Jun. 1991, pp. 1400-1408, 9 pages.

Ng et al. "Switched Capacitor DC-DC Converter: Superior where the Buck Converter has Dominated" PhD Thesis, UC Berkeley, Aug. 17, 2011.

Axelrod et al. "Single-switch single-stage switched-capacitor buck converter", Proc. of NORPIE 2004, 4th Nordic Workshop on Power and Industrial Electronics, Jun. 2004.

Andreassen—"Digital Variable Frequency Control for Zero Voltage Switching and Interleaving of Synchronous Buck Converters" 12th Intl. Power Electronics and Motion Control Conference, IEEE Aug. 2006, pp. 184-188, 5 pages.

Pilawa-Podgurski et al. "Merged Two-Stage Power Converter Architecture with Soft Charging Switched-Capacitor Energy Transfer" 39th IEEE Power Electronics Specialists Conference, 2008.

Pal Andreassen et al, Digital Variable Frequency Control for Zero Voltage Switching and Interleaving of Synchronous Buck Converters, 12th International Power Electronics and Motion Control Conference, Aug. 1, 2006, IEEE, Pi Publication date: Aug. 1, 2006, Aug. 1, 2008.

Dong Cao, Fang Zheng Peng, Multiphase Multilevel Modular DC DC Converter for High-Current High-Gain TEG Application, vol. 47, Nr.:3,IEEE Transactions on Industry Applications., May 1, 2011, IEEE Service Center, Piscataway, NJ., US, Publication date:May 1, 2011.

Luo et al., "Investigation of switched-capacitorized DC/DC converters," 2009 IEEE 6th International Power Electronics and Motion Control Conference, Wuhan, China, May 17-20, 2009, pp. 1270-1276, doi: 10.1109/IPEMC.2009.5157581.

U.S. Appl. No. 16/919,033: Amended Application Data Sheet filed Jul. 2, 2020, 7 pages.

Cheng, "New generation of switched capacitor converters," PESC 98 Record. 29th Annual IEEE Power Electronics Specialists Conference (Cat. No. 98CH36196), Fukuoka, Japan, May 22, 1998, pp. 1529-1535 vol. 2, doi: 10.1109/PESC.1998.703377.

Cervera et al. "A High Efficiency Resonant Switched Capacitor Converter with Continuous Conversion Ratio," Energy Conversion Congress and Exposition (ECCE), Sep. 2013, pp. 4969-4976.

Y. Lei, R. May and R. Pilawa-Podgurski, "Split-Phase Control: Achieving Complete Soft-Charging Operation of a Dickson Switched-Capacitor Converter," in IEEE Transactions on Power Electronics, vol. 31, No. 1, pp. 770-782, Jan. 2016, doi: 10.1109/TPEL.2015.2403715.

Alon Cervera et al. 'A high efficiency resonant switched capacitor converter with continuous conversion ratio' Energy Conversion Congress and Exposition, IEEE, 2013, pp. 4969-4976.

* cited by examiner

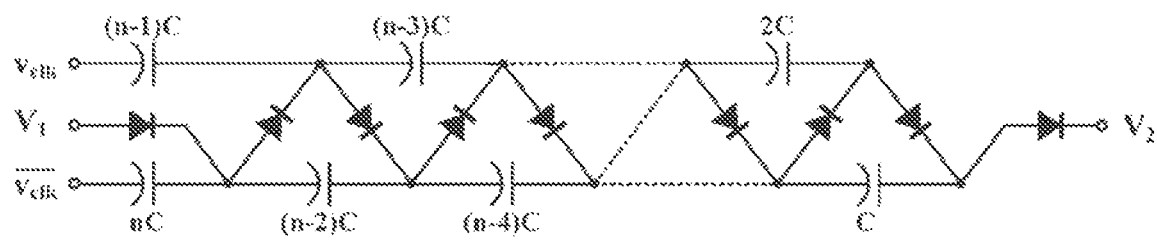
FIG. 10
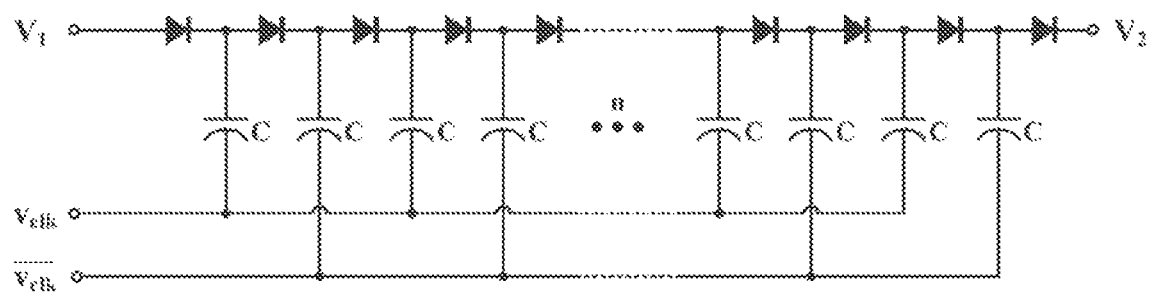
FIG. 11
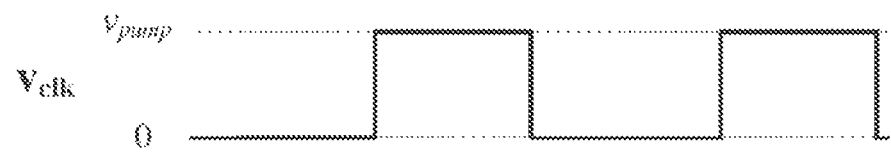
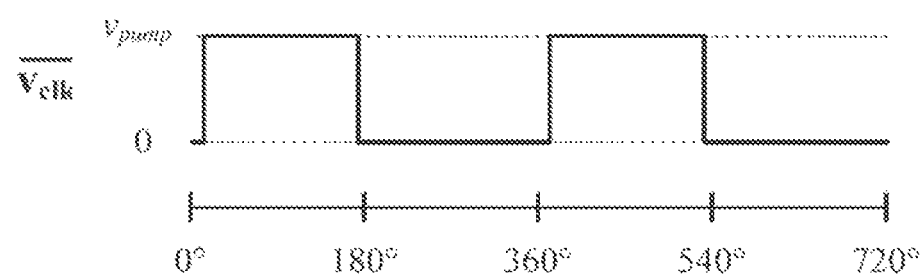
FIG. 12

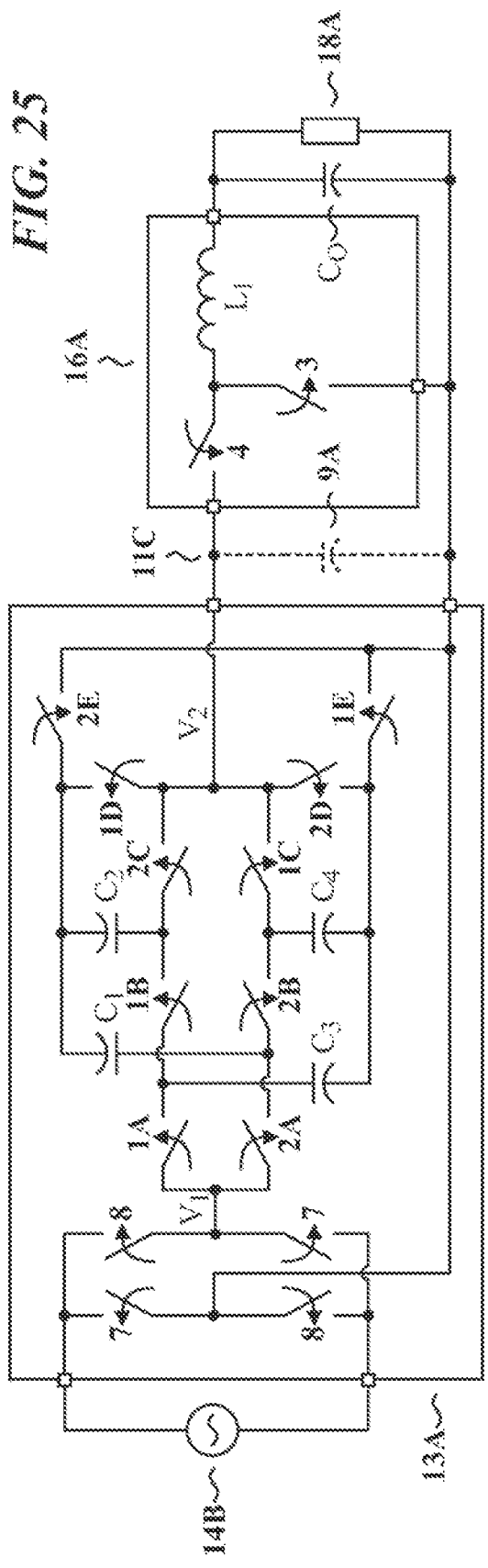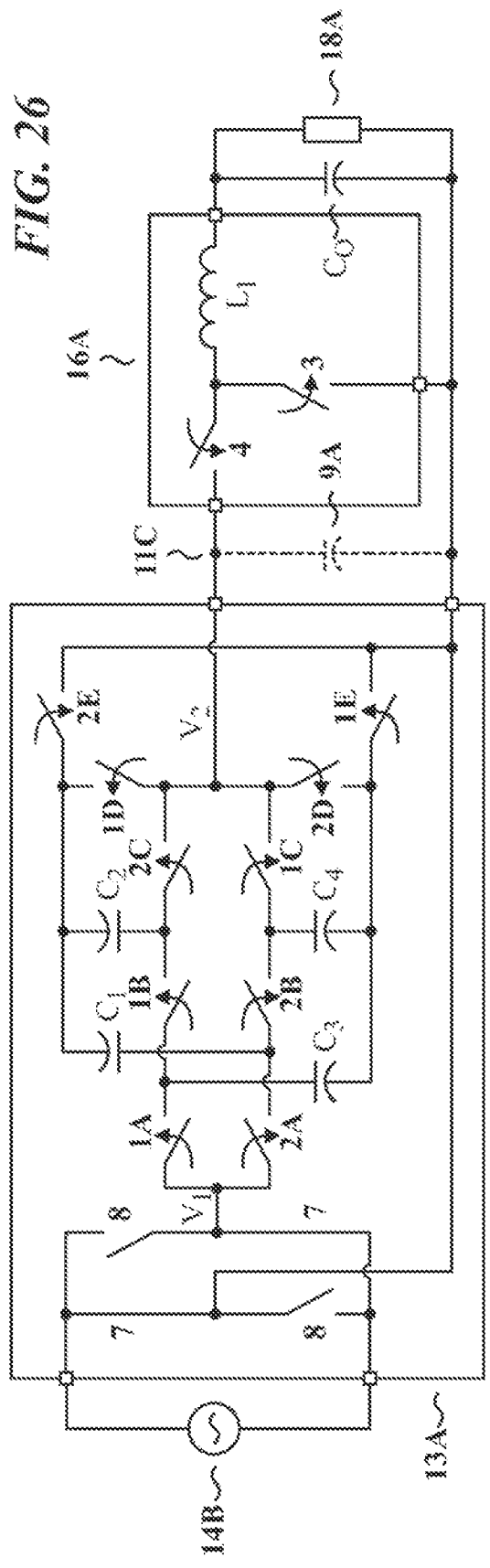

POWER CONVERTER WITH MODULAR STAGES CONNECTED BY FLOATING TERMINALS

CROSS REFERENCE TO RELATED APPLICATIONS

This application is a continuation of U.S. application Ser. No. 17/938,350, filed Oct. 6, 2022, now U.S. Pat. No. 11,817,778, which is a continuation of U.S. application Ser. No. 17/456,235, filed Nov. 23, 2021, now U.S. Pat. No. 11,496,047, which is a continuation of U.S. application Ser. No. 17/187,664, filed Feb. 26, 2021, now U.S. Pat. No. 11,211,862, which is a continuation of U.S. application Ser. No. 16/931,768, filed Jul. 17, 2020, now U.S. Pat. No. 10,938,300, which is a continuation of U.S. application Ser. No. 16/444,428, filed Jun. 18, 2019, now U.S. Pat. No. 10,917,007, which is a continuation of U.S. application Ser. No. 15/618,481, filed Jun. 9, 2017, now U.S. Pat. No. 10,326,358, which is a continuation of U.S. application Ser. No. 15/138,692, filed on Apr. 26, 2016, now U.S. Pat. No. 9,712,051, which is a continuation of U.S. application Ser. No. 14/513,747, filed on Oct. 14, 2014, now U.S. Pat. No. 9,362,826, which is a continuation of U.S. application Ser. No. 13/771,904, filed on Feb. 20, 2013, now U.S. Pat. No. 8,860,396, which is a continuation of International Application No. PCT/US2012/036455, filed on May 4, 2012, which claims the benefit of the priority date of U.S. Provisional Application No. 61/482,838, filed on May 5, 2011; U.S. Provisional Application No. 61/548,360, filed on Oct. 18, 2011; and U.S. Provisional Application No. 61/577,271, filed on Dec. 19, 2011. The content of these applications is hereby incorporated by reference in its entirety.

FIELD OF DISCLOSURE

This disclosure relates to power supplies, and in particular to power converters.

BACKGROUND

Many power converters include switches and one or more capacitors that are used, for example, to power portable electronic devices and consumer electronics. Switch-mode power converters regulate the output voltage or current by switching energy storage elements (i.e. inductors and capacitors) into different electrical configurations using a switch network. Switched capacitor converters are switch-mode power converters that primarily use capacitors to transfer energy. In such converters, the number of capacitors and switches increases as the transformation ratio increases Switches in the switch network are usually active devices that are implemented with transistors. The switch network may be integrated on a single or on multiple monolithic semiconductor substrates, or formed using discrete devices.

Typical DC-DC converters perform voltage transformation and output regulation. This is usually done in a single-stage converter such as a buck converter. However it is possible to split these two functions into two specialized stages, namely a transformation stage, such as a switching network, and a separate regulation stage, such as a regulating circuit. The transformation stage transforms one voltage into another, while the regulation stage ensures that the voltage and/or current output of the transformation stage maintains desired characteristics.

For example, referring to FIG. 1, in one converter 10, a switching network 12A is connected to a voltage source 14 at an input end thereof. An input of a regulating circuit 16A is then connected to an output of the switching network 12A. A load 18A is then connected to an output of the regulating circuit 16A. Power flows between the voltage source 14 and the load 18A in the direction indicated by the arrows. Such a converter is described in US Patent Publication 2009/0278520, filed on May 8, 2009, the contents of which are herein incorporated by reference.

SUMMARY

In one aspect, the invention features an apparatus for electric power conversion. Such an apparatus includes a converter having an input terminal and an output terminal. The converter includes a regulating circuit having an inductance, and switching elements connected to the inductance. These switching elements are controllable to switch between switching configurations. The regulating circuit maintains an average DC current through the inductance. The converter also includes a switching network having an input port and an output port. This switching network includes charge storage elements and switching elements connected to the charge storage elements. These switching elements are controllable to switch between switch configurations. In one switch configuration, the switching elements form a first arrangement of charge storage elements in which a charge storage element is charged through one of the input port and the output port of the switching network. In another configuration, the switching elements form a second arrangement of charge storage elements in which a charge storage element is discharged through one of the input port and output port of the switching network. The switching network and regulating circuit also satisfy at least one of the following configurations: (1) the regulating circuit is connected between the output terminal of the converter and the switching network, the switching network being an adiabatically charged switching network; (2) the regulating circuit is connected between the output terminal of the converter and the switching network, wherein either the switching network is a multiphase switching network, the switching network and the regulating circuit are bidirectional, or the regulator circuit is multi-phase; (3) the regulating circuit is connected between the input terminal of the converter and an input port of the switching network, the switching network being an adiabatically charged switching network; (4) the regulating circuit is connected between the input terminal of the converter and an input port of the switching network, and either the switching network is a multiphase switching network, the switching network and the regulating circuit are bidirectional, or the regulator circuit is multi-phase; (5) the switching circuit is connected between the regulating circuit and an additional regulating circuit; or (6) the regulating circuit is connected between the switching network and an additional switching network.

Embodiments of the invention include those in which the switching network includes a reconfigurable switching network and those in which the switching network includes a multi-phase switching network.

Other embodiments include those in which the regulating circuit includes a bidirectional regulating circuit those in which the regulating circuit includes a multi-phase regulating circuit, those in which the regulating circuit is bidirectional and includes a switch-mode power converter, those in which the regulating circuit is bidirectional regulating circuit and includes a resonant power converter, those in which the regulating circuit is connected to an output of the switching network, and those in which the regulating circuit is connected between the output terminal of the converter and the switching network, the switching network being an adiabatically charged switching network.

In other embodiments, the regulating circuit is connected between the output terminal of the converter and a switching network, and either the switching network is a multi-phase switching network, the switching network and the regulating circuit are bidirectional, or the regulator circuit is multi-phase.

In other embodiments, the regulating circuit is connected between the input terminal of the converter and an input port of the switching network, the switching network being an adiabatically charged switching network.

In yet other embodiments, the regulating circuit is connected between the input terminal of the converter and an input port of the switching network, and either the switching network is a multi-phase switching network, the switching network and the regulating circuit are bidirectional, or the regulator circuit is multi-phase.

Among the embodiments of the invention are those in which the switching circuit is connected between the regulating circuit and an additional regulating circuit, and those in which the regulating circuit is connected between the switching network and an additional switching network.

In additional embodiments, the switching circuit is configured as an AC switching circuit. Among these embodiments are those that also include a power-factor correction circuit connected to the AC switching circuit. Among these embodiments are those in which this power-factor correction circuit is connected between the AC switching circuit and the regulating circuit.

In another aspect, the invention features an apparatus including a converter having an input terminal and an output terminal. The converter includes a switching network having an input port and output port. This switching network includes charge storage elements, and switching elements connected to the charge storage elements. The switching elements are controllable to arrange the charge storage elements into a selected configuration. In at least one configuration, the switching elements form a first group of charge storage elements for discharging the charge storage elements through the output port of the switching network. In another, the switching elements form a second group of charge storage elements for charging the charge storage elements through the input port of the switching network. The converter also includes a bi-directional regulating circuit connected between at least one of an input terminal of the converter and an input port of the switching network and an output terminal of the converter and an output port of the switching network.

In some embodiments, the switching network includes a multi-phase switching network.

Also included among the embodiments are those in which the bidirectional regulating circuit includes a buck/boost circuit and those in which the bidirectional regulating circuit includes a split-pi circuit.

In another aspect, the invention features a converter having an input terminal and an output terminal. The converter includes a switching network having an input port and output port, charge storage elements, and switching elements connected to the charge storage elements for arranging the charge storage elements into one of a plurality of configurations. In one configuration, the switching elements form a first group of charge storage elements for discharging the charge storage elements through the output port of the switching network. In another configuration, the switching elements form a second group of charge storage elements for charging the charge storage elements through the input port of the switching network. The converter further includes a regulating circuit configured to provide a stepped-up voltage and connected between the output terminal of the converter and an output port of the switching network.

In yet another aspect, the invention features an apparatus having an input terminal and output terminal, and a switching network having an input port and output port, charge storage elements, and switching elements connected to the charge storage elements. The switching elements are controllable for causing the switching elements to be arranged in a plurality of configurations. In one configuration, the switching elements form a first group of charge storage elements for discharging the charge storage elements through the output port of the switching network. In another configuration the switching elements form a second group of charge storage elements for charging the charge storage elements through the input port of the switching network. The apparatus further includes a source regulating circuit connected between an input terminal of the converter and an input port of the switching network.

Some embodiments also include a load regulating circuit connected between an output terminal of the converter and an output port of the switching network.

In another aspect, the invention features a manufacture including multiple switching networks and regulating circuits having inputs and outputs that permit modular interconnections thereof for assembly of a DC-DC converter.

In some embodiments, at least one switching network includes a switched capacitor network. Among these are those in which the switched capacitor network includes an adiabatically charged switched capacitor network. These embodiments also include those in which the adiabatically charged switched capacitor network includes a cascade multiplier. In some of these embodiments, the cascade multiplier is driven by complementary clocked current sources.

In other embodiments, at least one regulating circuit includes a linear regulator.

Embodiments also include those in which the DC-DC converter includes series-connected switched capacitor networks, and those in which the DC-DC converter includes multiple regulating circuits that share a common switching network.

These and other features of the invention will be apparent from the following detailed description and the accompanying figures, in which:

DESCRIPTION OF THE FIGURES

FIG. 10 shows a series pumped symmetric cascade multiplier with diodes;

FIG. 11 shows a parallel pumped symmetric cascade multiplier with diodes;

FIG. 12 shows charge pump signals;

FIG. 25 shows a particular implementation of the AC-DC converter illustrated in FIG. 24;

FIG. 26 shows the AC-DC converter illustrated in FIG. 25 during the positive portion of the AC cycle;

DETAILED DESCRIPTION

Figure 1:
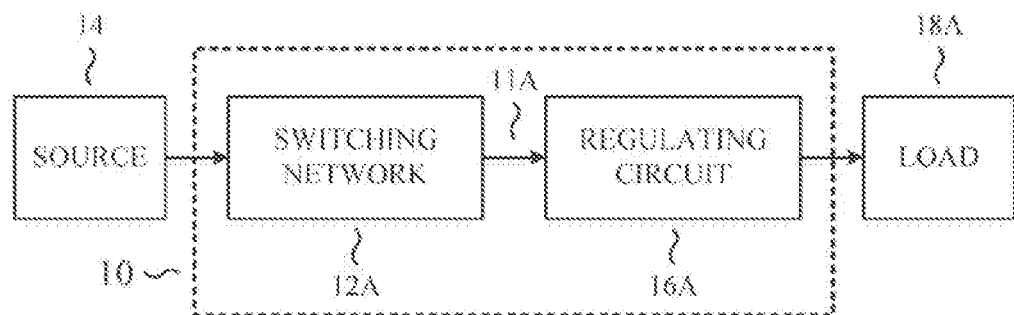
FIG. 1 shows a known DC-DC converter with separate regulating circuit and switching network.
Figure 1A:
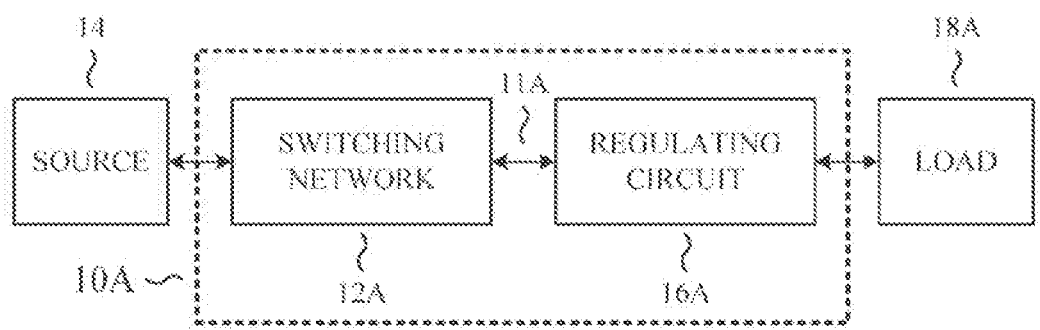
FIG. 1A shows a bidirectional version of FIG. 1.

Embodiments described herein rely at least in part on the recognition that in a multi-stage DC-DC converter, a switching network and a regulating circuit can be made essentially modular and can be mixed and matched in a variety of different ways. This provides a transformative integrated power solution (TIPS™) for the assembly of such converters. As such, the configuration shown in FIG. 1 represents only one of multiple ways to configure one or more switching networks 12A with one or more regulating circuits 16A. FIG. 1A shows a bidirectional version of FIG. 1, where power can flow either from a voltage source 14 to a load 18A or from the load 18A to the voltage source 14 as indicated by the arrows.

There are two fundamental elements described in connection with the following embodiments: switching networks and regulating circuits. Assuming series connected elements of the same type are combined, there are a total of four basic building blocks. These are shown FIGS. 1-4. The embodiments disclosed herein include at least one of the four basic building blocks shown in FIGS. 1-4.

Additional embodiments further contemplate the application of object-oriented programming concepts to the design of DC-DC converters by enabling switching networks 12A and regulating circuits 16A to be "instantiated" in a variety of different ways, so long as their inputs and outputs continue to match in a way that facilitates modular assembly of DC-DC converters having various properties.

The switching network 12A in many embodiments is instantiated as a switching capacitor network. Among the more useful switched capacitor topologies are: Ladder, Dickson, Series-Parallel, Fibonacci, and Doubler, all of which can be adiabatically charged and configured into multi-phase networks. A particularly useful switching capacitor network is an adiabatically charged version of a full-wave cascade multiplier. However, diabatically charged versions can also be used.

As used herein, changing the charge on a capacitor adiabatically means causing an amount of charge stored in that capacitor to change by passing the charge through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic elements, resistors, and combinations thereof.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an adiabatically charged switching network is a switching network having at least one capacitor that is both adiabatically charged and adiabatically discharged. A diabatically charged switching network is a switching network that is not an adiabatically charged switching network.

The regulating circuit 16A can be instantiated as any converter with the ability to regulate the output voltage. A buck converter for example, is an attractive candidate due to its high efficiency and speed. Other suitable regulating circuits 16A include boost converters, buck/boost converters, fly-back converters, Cuk converters, resonant converters, and linear regulators.

Figure 2:
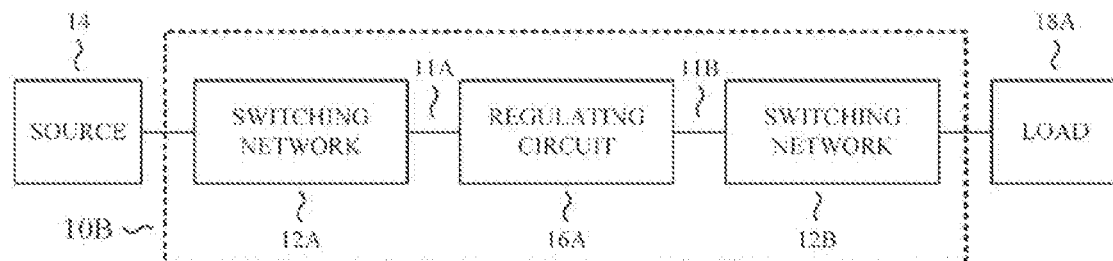
FIGS. 2-4 show DC-DC converters with alternate configurations of regulating circuits and switching networks.

In one embodiment, shown in FIG. 2, a voltage source 14 provides an input to a first switching network 12A, which is instantiated as a switched capacitor network. The output of the first switching network 12A is a lower voltage than the input voltage that is provided to a regulating circuit 16A (e.g. a buck, a boost, or a buck/boost converter). This regulating circuit 16A provides a regulated input voltage to a second switching network 12B, such as another switched capacitor network. A high voltage output of this second switching network 12B is then applied to a load 18A.

An embodiment such as that shown in FIG. 2 can be configured to regulate the load 18A or to regulate the source 14 depending on the direction of energy flow.

Figure 3:
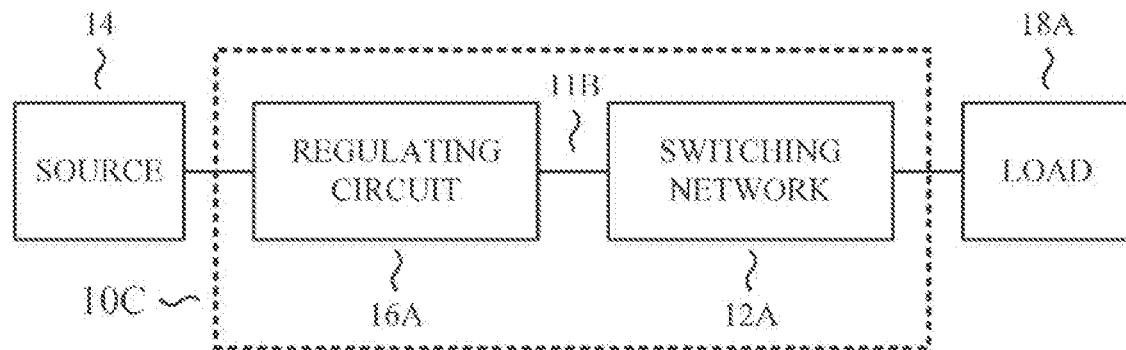

In another embodiment, shown in FIG. 3, a low voltage source 14 connects to an input of a regulating circuit 16A, the output of which is provided to an input of a switching network 12A to be boosted to a higher DC value. The output of the switching network is then provided to a load 18A.

An embodiment such as that shown in FIG. 3 can be used to regulate the source 14 or the load 18A depending on the direction of energy flow.

Figure 4:
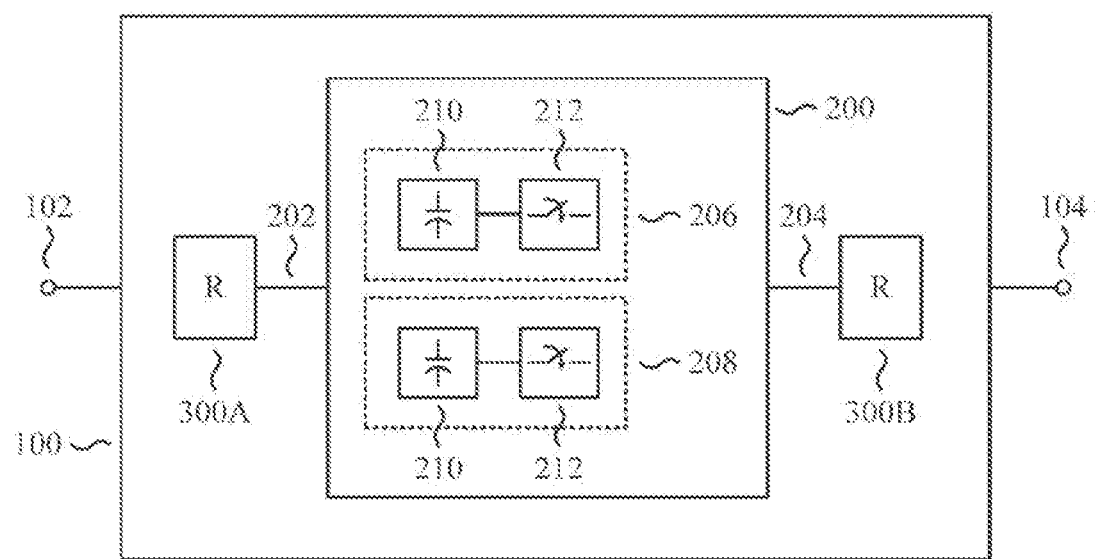

Referring now to FIG. 4, another embodiment of a converter 100 includes a first regulating circuit 300A connected to an input 102 thereof and a second regulating circuit 300B connected to an output 104 thereof. Between the first and second regulating circuits 300A, 300B is a switching network 200 having an input 202 and an output 204. The switching network includes charge storage elements 210 interconnected by switches 212. These charge storage elements 210 are divided into first and second groups 206, 208.

Figure 5:
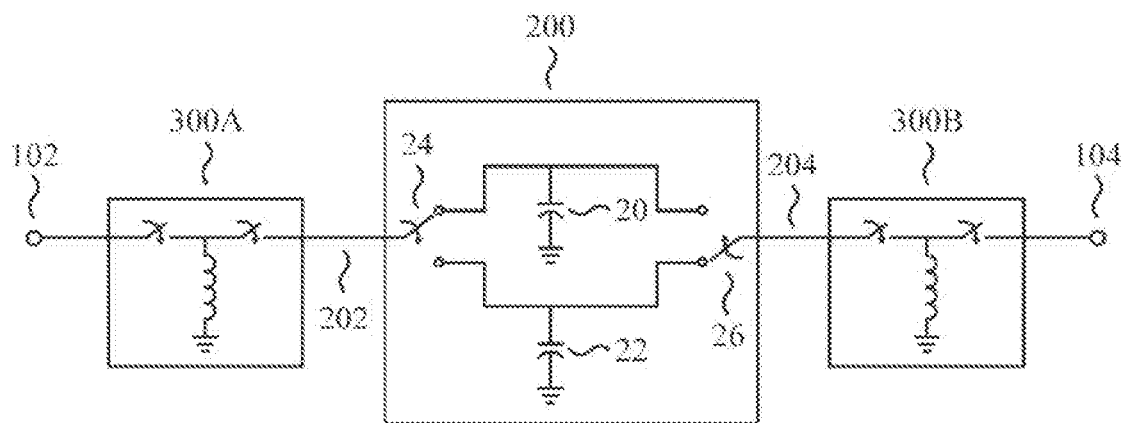
FIG. 5 shows a particular implementation of the power converter illustrated in FIG. 4.

In some embodiments, the switching network 200 can be a bidirectional switching capacitor network such as that shown in FIG. 5. The switching capacitor network in FIG. features a first capacitor 20 and a second capacitor 22 in parallel. A first switch 24 selectively connects one of the first and second capacitors 20, 22 to a first regulating circuit 300A, and a second switch 26 selectively connects one of the first and second capacitors 20, 22 to the second regulating circuit 300B. Both the first and second switches 24, 26 can be operated at high frequency, thus facilitating the adiabatic charging and discharging of the first and second capacitors 20, 22.

The particular embodiment shown in FIG. 5 has a two-phase switching network 200. However, other types of switching networks can be used instead.

Figure 6:
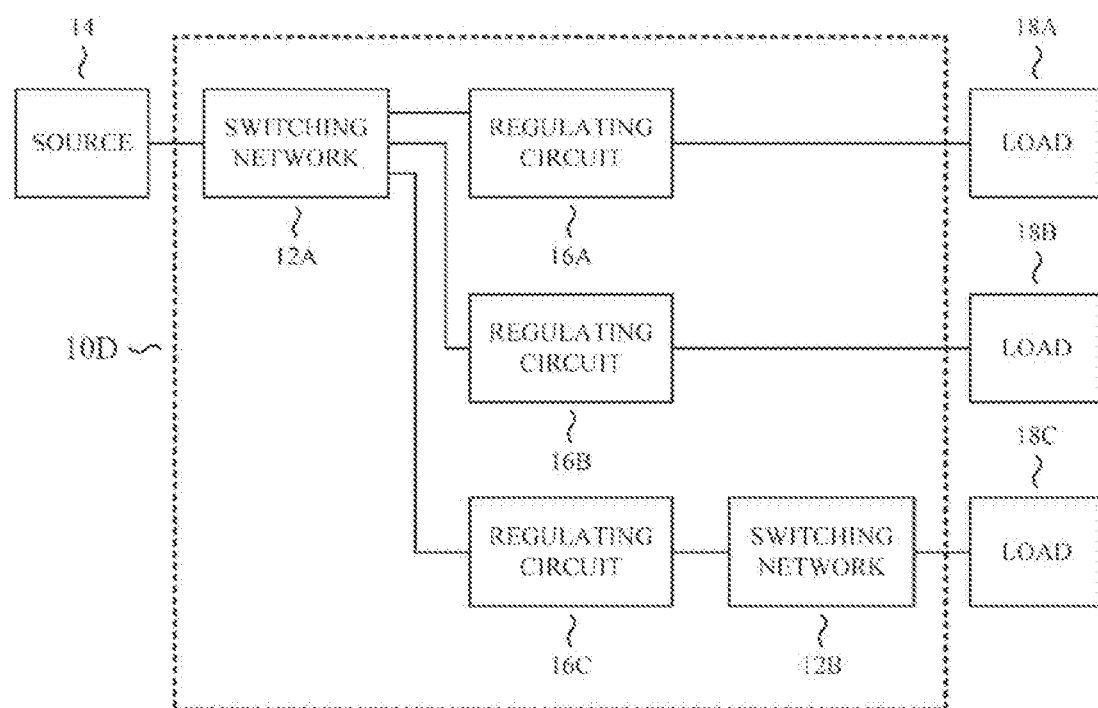
FIG. 6 shows an embodiment with multiple regulating circuits.

In yet another embodiment, shown in FIG. 6, multiple regulating circuits 16A, 16B, 16C are provided at an output of a first switching network 12A for driving multiple loads 18A-18C. For one of the loads 18C, a second switching network 12B is provided between the load 18C and the corresponding regulating circuit 16C thus creating a pathway similar to that shown in FIG. 2. FIG. 6 thus provides an example of how the modular construction of regulating circuits and switching networks facilitates the ability to mix and match components to provide flexibility in DC-DC converter construction.

A switched capacitor (SC) DC-DC power converter includes a network of switches and capacitors. By cycling the network through different topological states using these switches, one can transfer energy from an input to an output of the SC network. Some converters, known as "charge pumps," can be used to produce high voltages in FLASH and other reprogrammable memories.

Figure 7:
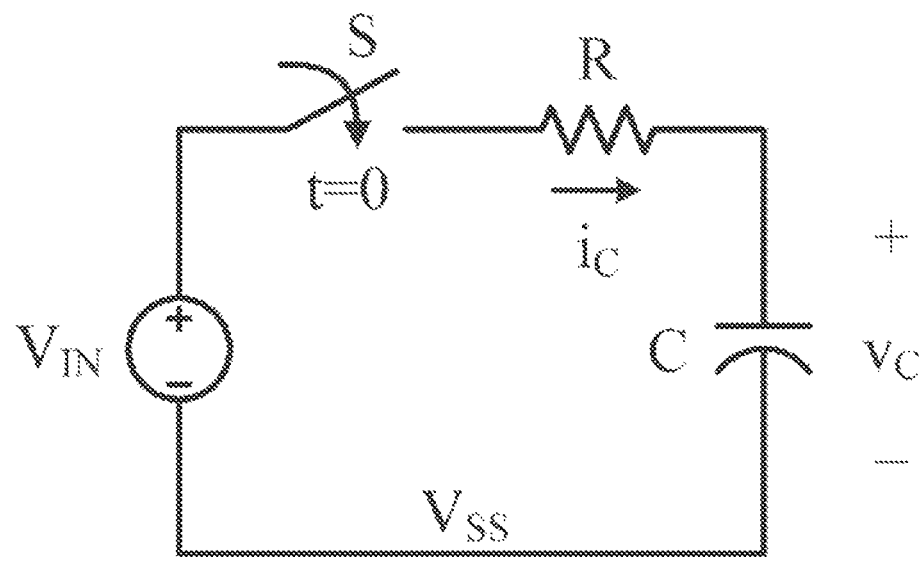
FIG. 7 shows an RC circuit.

FIG. 7 shows a capacitor C initially charged to some value $V_C(0)$. At t=0 the switch S is closed. At that instant, a brief surge of current flows as the capacitor C charges to its final value of $V_{in}$. The rate of charging can be described by a time constant $\tau=RC$, which indicates the time it takes the voltage to either rise or fall to within 1/e of its final value. The exact capacitor voltage $v_c(t)$ and current $i_c(t)$ are given by the following equations:

$$v_c(t) = v_c(0) + [V_{in} - v_c(0)](1 e^{-t/RC}), \text{ and} \quad (1.1)$$

$$i_c(t) = C\frac{dv_c}{dt} = \frac{V_{in} - v_c(0)}{R} e^{-t/RC}. \quad (1.2)$$

The energy loss incurred while charging the capacitor can be found by calculating the energy dissipated in resistor R, which is $$E_{loss}(t) = \int_{t=0}^{\infty} i_R(t) \times v_R(t) dt = \int_{t=0}^{\infty} [i_c(t)]^2 R \, dt. \quad (1.3)$$

The equation can be further simplified by substituting the expression for $i_c(t)$ from equation (1.2) into equation (1.3). Evaluating the integral then yields $$E_{loss}(t) = \frac{1}{2}[V_{in} - v_c(0)]^2 C[1 - e^{-2t/RC}].$$

If the transients are allowed to settle (i.e. t→∞), the total energy loss incurred in charging the capacitor is independent of its resistance R. In that case, the amount of energy loss is equal to $$E_{loss}(\infty) = \frac{1}{2} C \Delta v_c^2$$

Figure 8:
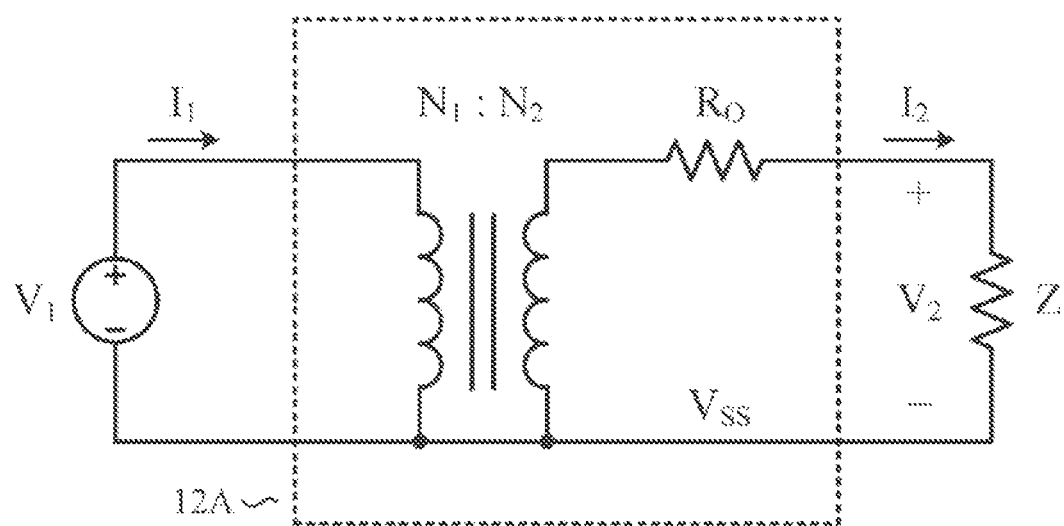
FIG. 8 shows a model of a switched capacitor DC-DC converter.

A switched capacitor converter can be modeled as an ideal transformer, as shown in FIG. 8, with a finite output resistance $R_o$ that accounts for the power loss incurred in charging or discharging of the energy transfer capacitors, as shown in FIG. 8. This loss is typically dissipated in the ON resistance of the MOSFETs and equivalent series resistance of the capacitors.

The output voltage of the switched-capacitor converter is given by $$V_o = V_{in}\frac{N_2}{N_1} - I_o R_o$$

There are two limiting cases where the operation of the switched capacitor converters can be simplified and $R_o$ easily found. These are referred to as the "slow-switching limit" and the "fast-switching limit."

In the fast-switching limit ($\tau \gg T_{sw}$), the charging and discharging currents are approximately constant, resulting in a triangular AC ripple on the capacitors. Hence, $R_o$ is sensitive to the series resistance of the MOSFETs and capacitors, but is not a function of the operating frequency. In this case, the output resistance of the converter operating in the fast-switching limit is a function of parasitic resistance.

In the slow-switching limit, the switching period $T_{sw}$ is much longer than the RC time constant $\tau$ of the energy transfer capacitors. Under this condition, systemic energy Joss irrespective of the resistance of the capacitors and switches. This systemic energy loss arises in part because the root mean square (RMS) of the charging and discharging current is a function of the RC time constant. If the effective resistance $R_{eff}$ of the charging path is reduced (i.e. reduced RC), the RMS current increases and it so happens that the total charging energy loss ($E_{loss}=I_{RMS}^2 R_{eff}=\frac{1}{2}C\times\Delta_{C^2}$) is independent of $R_{eff}$. One solution to minimize this energy loss is to increase the size of the pump capacitors in the switched capacitor network.

It is desirable for a switching capacitor network to have a common ground, large transformation ratio, low switch stress, low DC capacitor voltage, and low output resistance. Among the more useful topologies are: Ladder, Dickson, Series-Parallel, Fibonacci, and Doubler.

Figure 9A:
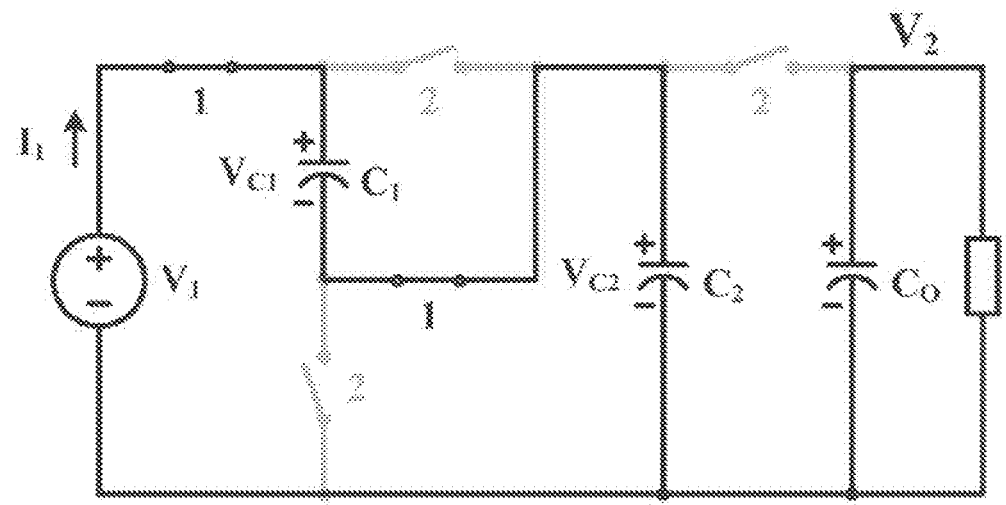
FIGS. 9A and 9B show a series-parallel SC converter operating in charge phase and discharge phase respectively.
Figure 9B:
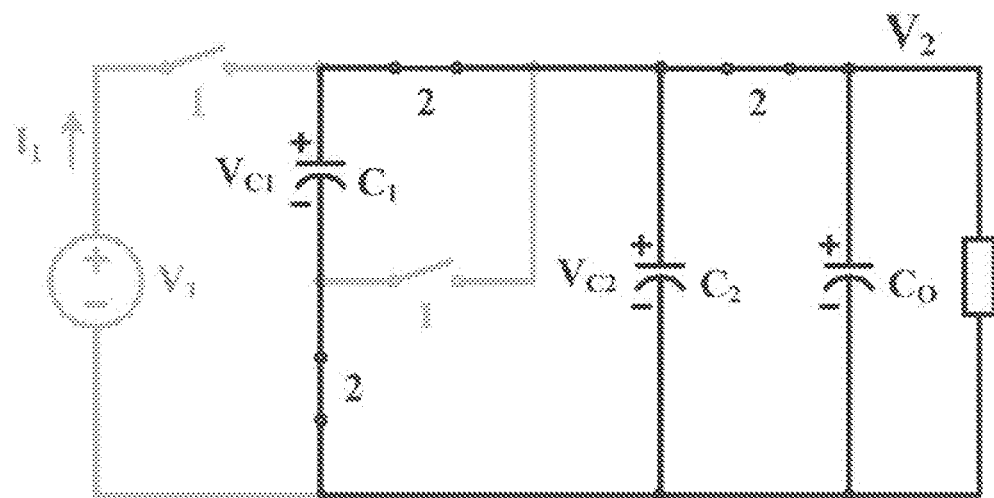

One useful converter is a series-parallel switched capacitor converter. FIGS. 9A and 9B show a 2:1 series-parallel switched capacitor converter operating in charge phase and in discharge phase, respectively. During the charge phase, the capacitors are in series. In the discharge phase, the capacitors are in parallel. In its charge phase, capacitor voltages $v_{C1}$ and $v_{C2}$ add up to $V_1$ while in its discharge phase, $v_{C1}$ and $v_{C2}$ equal $V_2$, which means that $V_2=V_1/2$.

Other useful topologies are cascade multiplier topologies, as shown in FIGS. 10 and 11. In both charge pumps, the source is located at $V_1$ and the load is located at $V_2$. In these types of charge pumps, packets of charge are pumped along a diode chain as the coupling capacitors are successively charged and discharged. As shown in FIG. 12, clock signals $v_{clk}$ and $\overline{v_{clk}}$ with amplitude $v_{pump}$ are 180 degrees out of phase. The coupling capacitors can either be pumped in series or parallel.

It takes n clock cycles for the initial charge to reach the output. The charge on the final pump capacitor is n times larger than the charge on the initial pump capacitor and thus the output voltage $V_2$ for the converters is $V_1+(n-1)/v_{pump}$ in both pumping configurations.

Although the foregoing topologies are suitable for stepping up voltage, they can also be used to step down voltage by switching the location of the source and the load. In such cases, the diodes can be replaced with controlled switches such as MOSFETs and BJTs.

Figure 13:
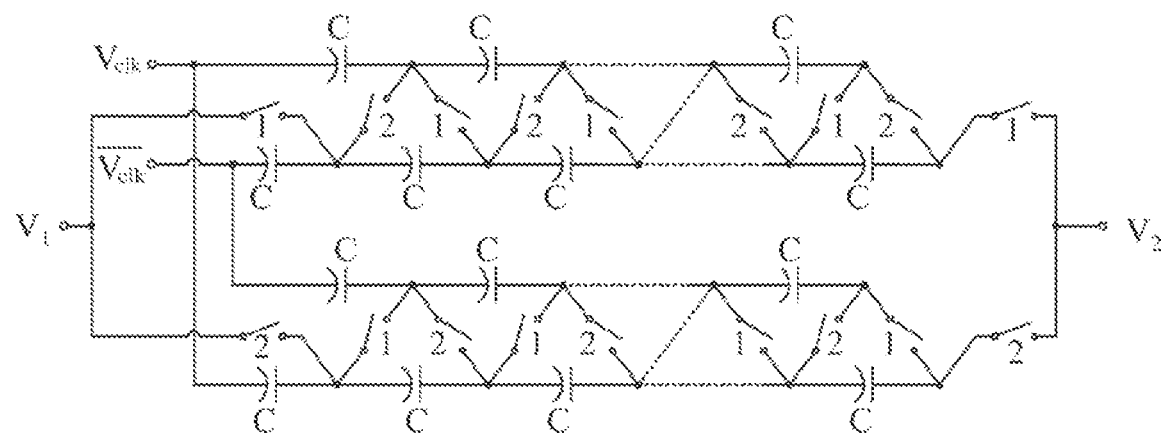
FIG. 13 shows a two-phase symmetric series pumped cascade multiplier with switches.
Figure 14:
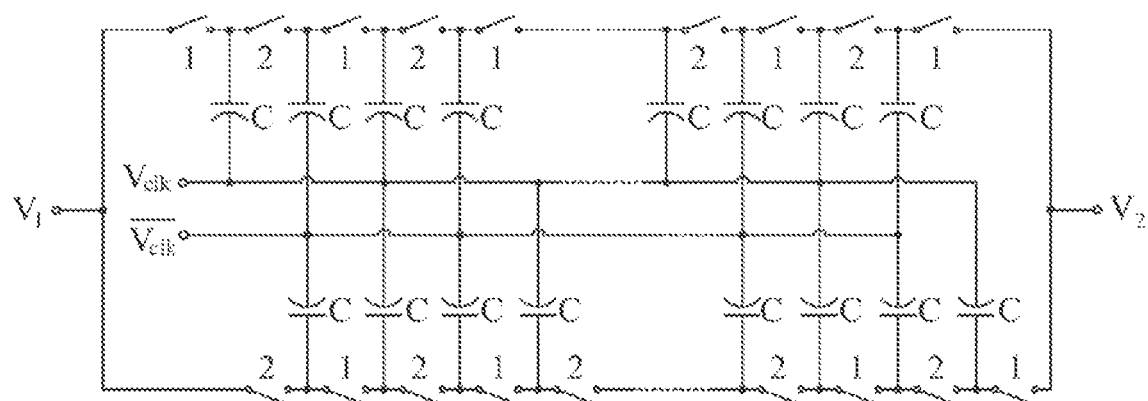
FIG. 14 shows a two-phase symmetric parallel pumped cascade multiplier with switches.
Figure 15:
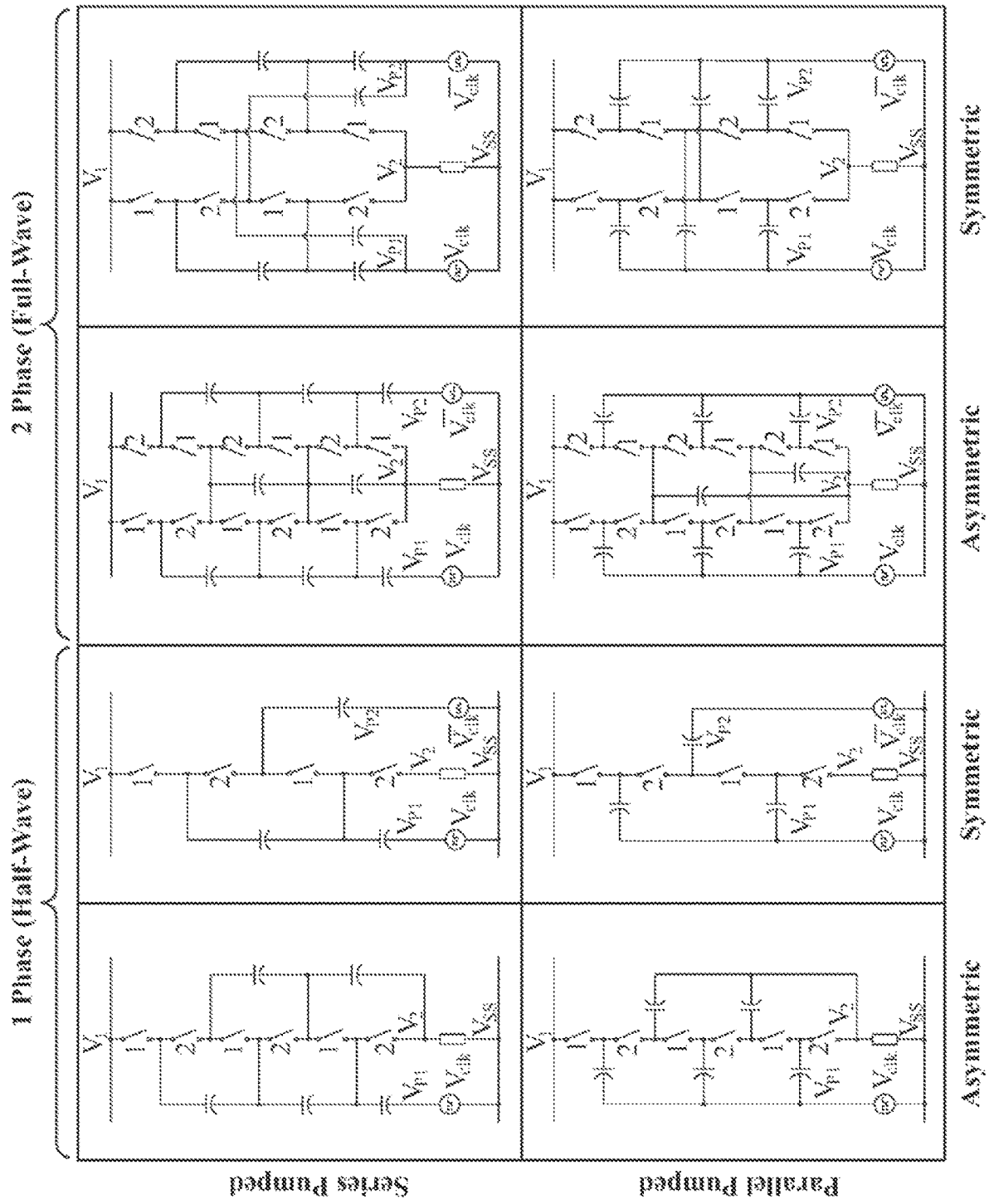
FIG. 15 shows four different cascade multipliers along with corresponding half-wave versions.

The foregoing cascade multipliers are half-wave multipliers in which charge is transferred during one phase of the of the clock signal. This causes a discontinuous input current. Both of these cascade multipliers can be converted into full-wave multipliers by connecting two half-wave multipliers in parallel and running the half-wave multipliers 180 degrees out of phase. FIG. 13 shows a full-wave symmetric series pumped cascade multiplier version while FIG. 14 shows a full-wave symmetric parallel pumped cascade multiplier version. Unlike the diodes in the half-multiplier, the switches in FIG. 13 and FIG. 14 are bidirectional. As a result, in both of these cascade multipliers, power can flow either from the source to the load or from the load to the source. Asymmetric multipliers can also be converted into full-wave multipliers FIG. 15 shows four different step-up versions of full-wave symmetric multipliers along with their corresponding half-wave versions. Furthermore, it is possible to combine N phases in parallel and run them 180 degrees/N out of phase to reduce output voltage ripple and increase output power handling capability.

The basic building blocks in the modular architecture shown FIGS. 1-4 can either be connected as independent entities or coupled entities. In the situation where the switching networks and regulating circuits are tightly coupled, it is possible to prevent and/or reduce the systemic energy loss mechanism of the switching networks through adiabatic charging. This generally includes using a regulating circuit to control the charging and discharging of the capacitors in the switching network. Furthermore, the output voltage of the regulating circuit and thus the total converter can be regulated in response to external stimuli. One approach to regulating the output voltage is by controlling the average DC current in the magnetic storage element.

A desirable feature of a regulating circuit is to limit the root mean square (RMS) current through the capacitors in the switching network. To do that, the regulating circuit uses either resistive or magnetic storage elements. Unfortunately, resistive elements would consume power so their use is less desirable. Therefore, embodiments described herein rely on a combination of switches and a magnetic storage element in the regulating circuit. The regulating circuit limits the RMS current by forcing the capacitor current through a magnetic storage element in a regulating circuit that has an average DC current. The switches in the regulating circuit are operated so as to maintain an average DC current through the magnetic storage element.

The regulating circuit may limit both the RMS charging current and the RMS discharging current of at least one capacitor in the switching network. A single regulating circuit may limit the current in or out of switching network by sinking and/or sourcing current. Therefore, there are four fundamental configurations, which are shown in FIGS. 1-4. Assuming power flows from source to load then, in FIG. 1, regulating circuit 16A may sink both the charging and discharging current of switching network 12A. In FIG. 3, regulating circuit 16A may source both the charging and discharging current of switching network 12A. In FIG. 4, regulating circuit 300A may source the charging current of switching network 200 and regulating circuit 300B may sink the discharging current of the same switching network 200 and vice-versa. In FIG. 2, regulating circuit 16A may source both the charging and discharging current of switching network 12B while also sinking both the charging and discharging current of switching network 12A. Furthermore, if both the switching networks and regulating circuits allow power to flow in both directions then bidirectional power flow is possible (source to load and load to source).

One embodiment relies on at least partially adiabatically charging full-wave cascade multipliers. Cascade multipliers are a preferred switching network because of their superior fast-switching limit impedance, ease of scaling up in voltage, and low switch stress.

Figure 16:
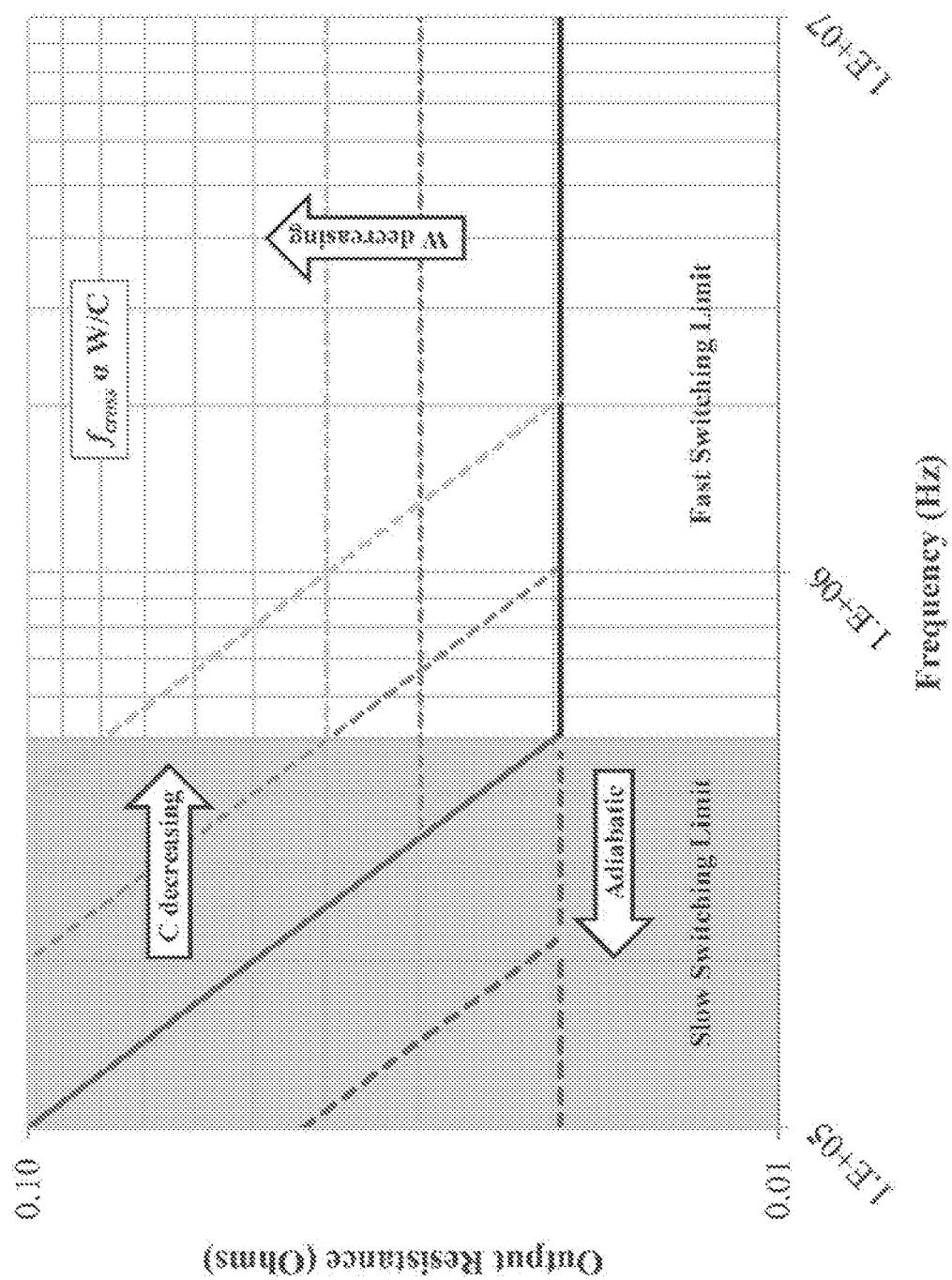
FIG. 16 shows output impedance of a switched-capacitor converter as a function of frequency.

In cascade multipliers, the coupling capacitors are typically pumped with a clocked voltage source $v_{clk}$ & $\overline{v_{clk}}$. However, if the coupling capacitors are pumped with a clocked current source $i_{clk}$ & $\overline{i_{clk}}$ instead, then the RMS charging and discharging current in the coupling capacitor may be limited. In this case, the capacitors are at least partially charged adiabatically thus lowering, if not eliminating, the $\frac{1}{2}C \times \Delta V c^2$ loss that is associated with a switched capacitor converter when operated in the slow-switching limit. This has the effect of lowering the output impedance to the fast-switching limit impedance. As shown by the black dotted line in FIG. 16, which depicts adiabatic operation under full adiabatic charging, the output impedance would no longer be a function of switching frequency.

With all else being equal, an adiabatically charged switched-capacitor converter can operate at a much lower switching frequency than a conventionally charged switched capacitor converter, but at higher efficiency. Conversely, an adiabatically charged switched-capacitor converter can operate at the same frequency and with the same efficiency as a conventionally charged switched-capacitor converter, but with much smaller coupling capacitors, for example between four and ten times smaller.

Figure 17:
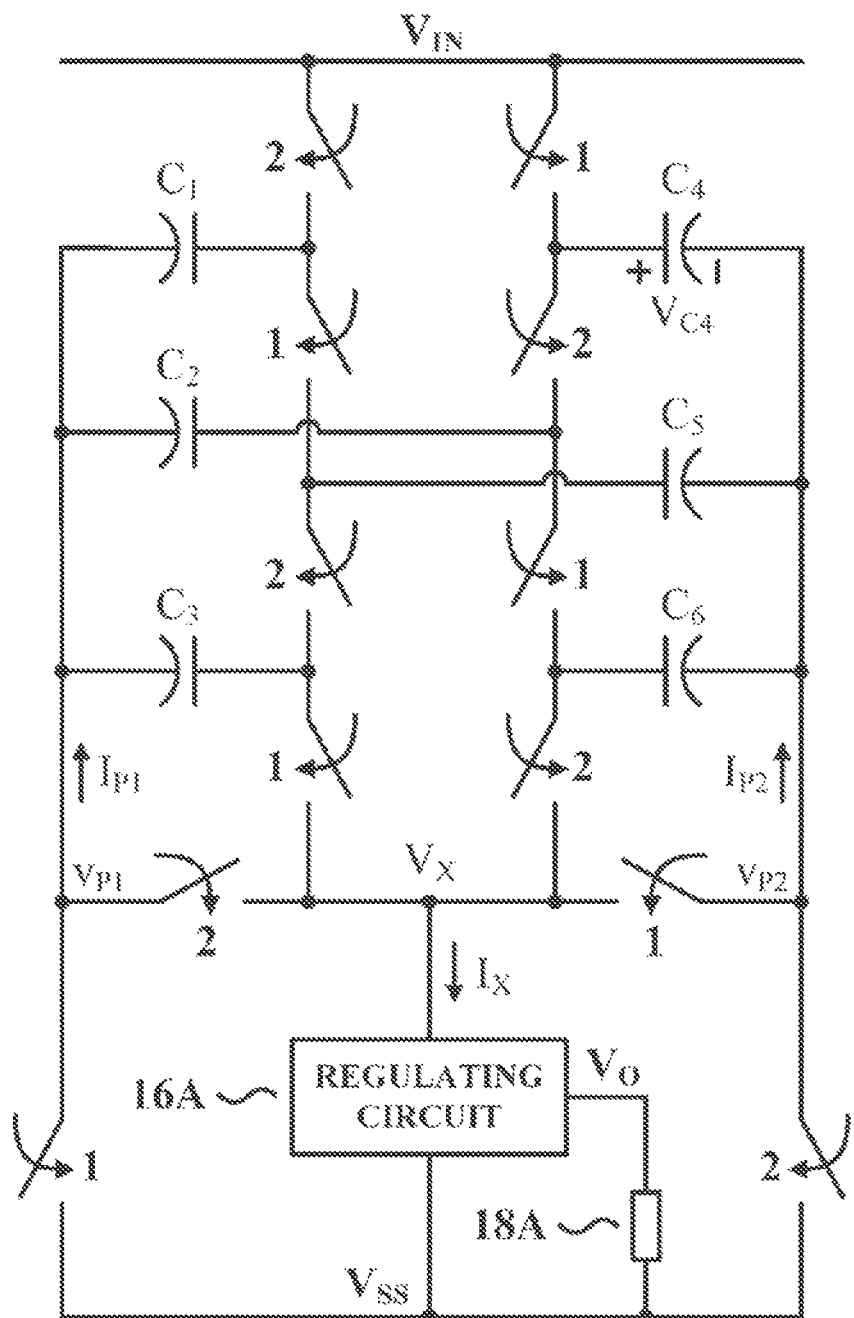
FIG. 17 shows a particular implementation of the DC-DC converter illustrated in FIG. 1A with a full-wave adiabatically charged switching network.

FIG. 17 shows a step-down converter consistent with the architecture shown in FIG. 1A. However, in this embodiment, the switching network 12A is adiabatically charged using the regulating circuit 16A. The clocked current sources $i_{clk}$ & $\overline{i_{clk}}$ are emulated by four switches and regulating circuit 16A. The output capacitor $C_o$ has also been removed so as to allow $V_x$ to swing. In this example, the regulating circuit 16A is a boost converter that behaves as constant source with a small AC ripple. Any power converter that has a non-capacitive input impedance would have allowed adiabatic operation. Although switch-mode power converters are attractive candidates due to their high efficiency, linear regulators are also practical.

Figure 18:
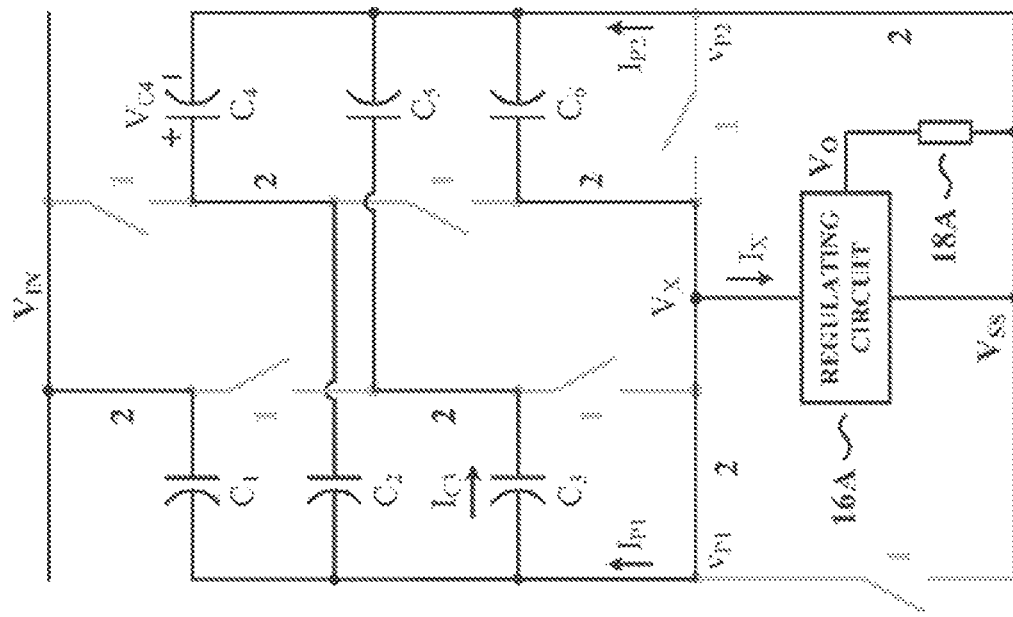
FIG. 18 shows the DC-DC converter illustrated in FIG. 17 during phase A.
Figure 19:
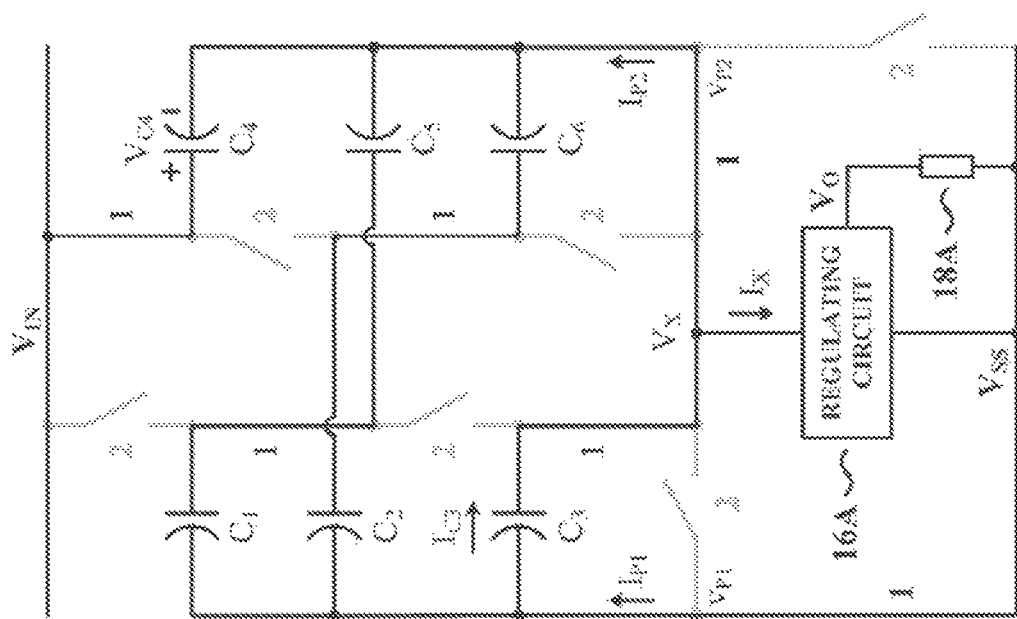
FIG. 19 shows the DC-DC converter illustrated in FIG. 17 during phase B.

In operation, closing switches labeled 1 charges capacitors $C_4$, $C_5$, and $C_6$ while discharging capacitors $C_1$, $C_2$ and $C_3$. Similarly, closing switches 2 has the complementary effect. The first topological state (phase A) is shown in FIG. 18, where all switches labeled 1 are closed and all switches labeled 2 are opened. Similarly, the second topological state (phase B) is shown in FIG. 19, where all switches labeled 2 are closed and all switches labeled 1 are opened. In this embodiment, the regulating circuit 16A limits the RMS charge and discharging current of each capacitor. For example, capacitor $C_3$ is discharged through the filter inductor in regulating circuit 16A during phase A, while capacitor $C_3$ is charged through the filter inductor in regulating circuit 16A during phase B, clearly demonstrating the adiabatic concept. Furthermore, all of the active components are implemented with switches so the converter can process power in both directions.

Figure 20:
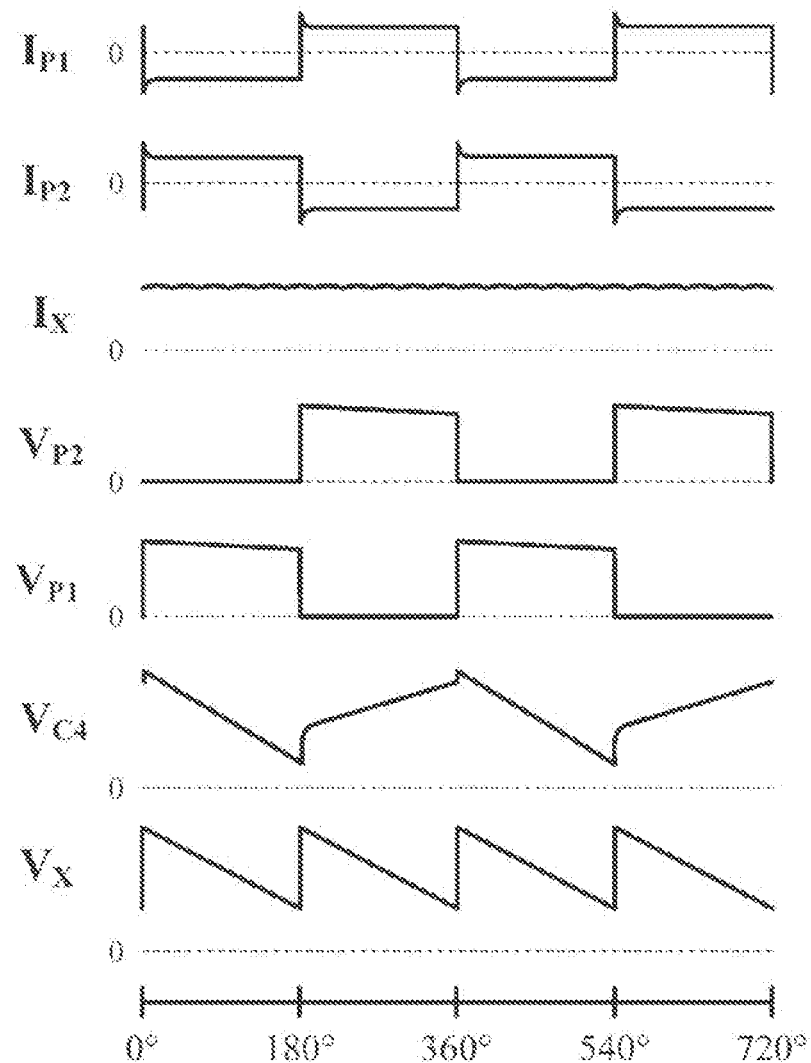
FIG. 20 shows various waveforms associated with a 4:1 adiabatically charged converter.

A few representative node voltages and currents are shown in FIG. 20. There is a slight amount of distortion on the rising and falling edges of the two illustrated currents ($I_{P1}$ and $I_{P2}$), but for the most part, the currents resemble two clocks 180 degrees out of phase. In general, adiabatic charging occurs in cascade multipliers if at least one end of a switch stack is not loaded with capacitance, as is the case in this embodiment, where the $V_X$ node is loaded down by the regulating circuit 16A.

The modular architecture with the basic building blocks shown in FIGS. 1-4 may be expanded to cover a wider range of applications, such as high-voltage DC, AC-DC, buck-boost, and multiple output voltages. Each of these applications includes separating the transformation and regulation functions. Extension of the architecture can also incorporate adiabatically charged switched capacitors converters.

Figure 21:
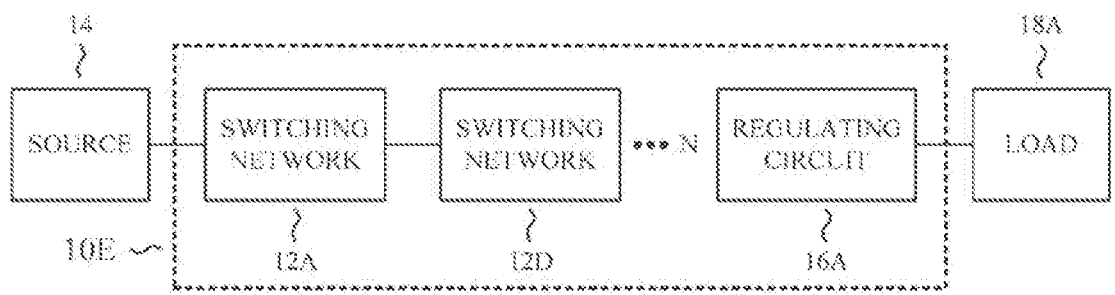
FIG. 21 shows adiabatic charging of series connected stages.

In many switched-capacitor converters, the number of capacitors and switches increases linearly with the transformation ratio. Thus, a large number of capacitors and switches are required if the transformation ratio is large. Alternatively, a large transformation ratio can be achieved by connecting numerous low gain stages in series as depicted in FIG. 21. The transformation ratio of the total switch capacitor stack ($V_{in}/V_x$) is as follows:

$$\frac{V_{in}}{V_x} = N_1 \times N_2 \ldots N_n \quad (2.1)$$

The main disadvantage of the series stacked configuration is that the voltage stresses on the front stages are much higher than those of the rear stages. This will normally require stages with different voltage ratings and sizes.

Adiabatic charging of a preceding series-connected switching network only occurs if the following switching network controls the charging and discharging current of the preceding stage. Thus, it is preferable to use full-wave switched-capacitor converters in the front stages or to use switched-capacitor stages such as the single-phase series-parallel switched-capacitor converters with magnetic based filters.

Figure 22:
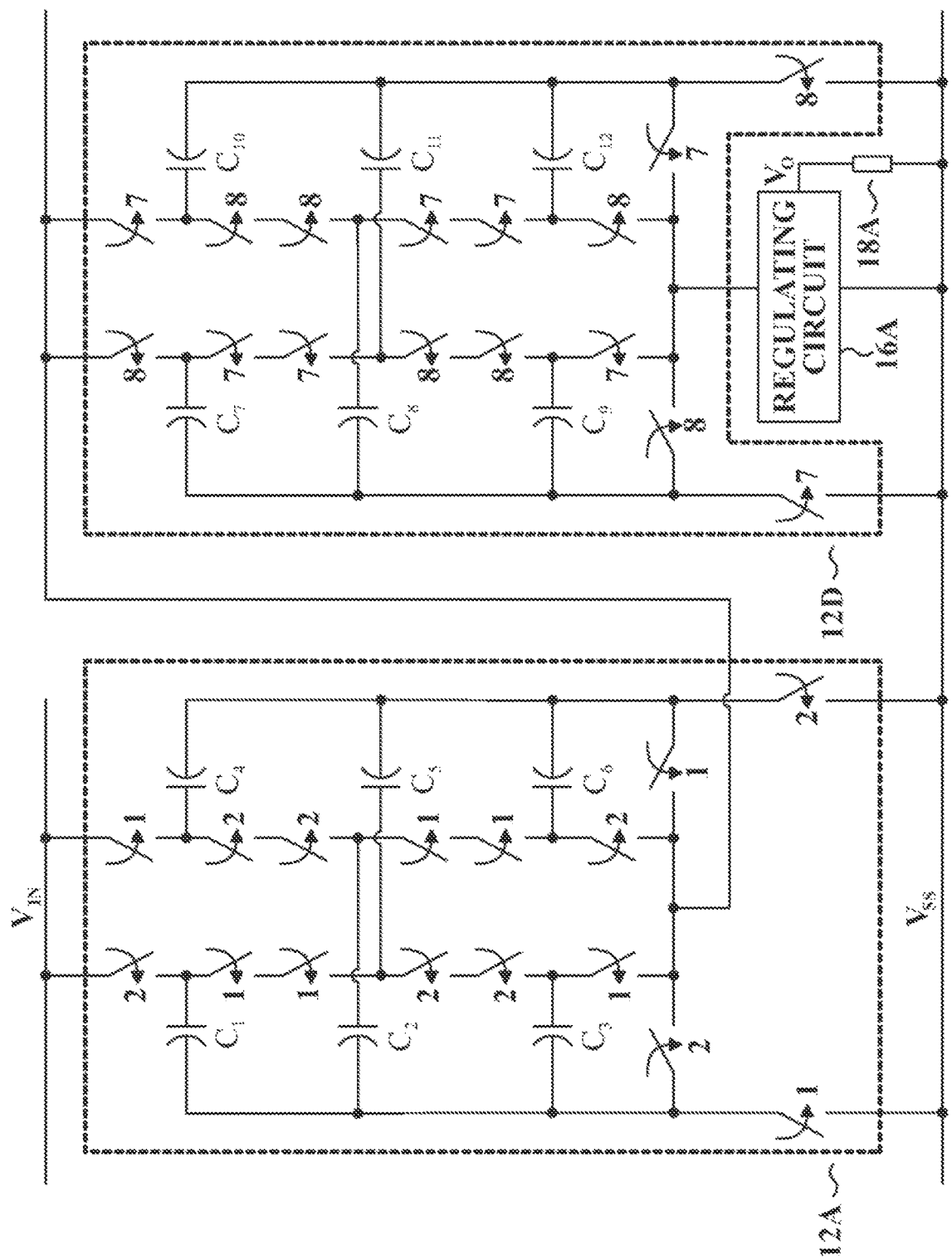
FIG. 22 shows a particular implementation of the power converter illustrated in FIG. 21.

FIG. 22 shows a converter with two series-connected switching networks consistent with the architecture shown in FIG. 21. Both switching networks 12A and 12D are two-phase cascade multipliers. In operation, switches labeled 1 and 2 are always in complementary states and switches labeled 7 and 8 are always in complementary states. Thus, in a first switched-state, all switches labeled "1" are open and all switches labeled "2" are closed. In a second switched-state, all switches labeled "1" are closed and all switches labeled "2" are opened. In this embodiment, closing switches 1 charges the capacitors $C_1$, $C_2$, $C_3$, while discharging the capacitors $C_4$, $C_5$, $C_6$ and closing switches 2 has the complementary effect. Also, closing switches 7 charges capacitors $C_7$, $C_8$, $C_9$, while discharging capacitors $C_{10}$, $C_{11}$, $C_{12}$ and closing switches 8 has the complementary effect.

The power converter provides a total step-down of 32:1, assuming the regulating circuit 16A is a buck converter with a nominal step-down ratio of 2:1. Furthermore, if the input voltage is 32 V and the output voltage is 1 V, then the switches in the first switching network 12A will need to block 8 volts while the switches in the second switching network 12D will need to block 2 volts.

The modular architecture with the basic building blocks shown in FIGS. 1-4 may be configured to handle an AC input voltage as well. One of the main attributes of switched capacitor converters is their ability to operate efficiency over a large input range by reconfiguring the switched-capacitor network. If the AC wall voltage (i.e. 60 Hz & 120 $V_{RMS}$) can be thought of as a slow moving DC voltage, then the front-end switched-capacitor stage should be able to unfold the time-varying input voltage into a relatively stable DC voltage.

Figure 23:
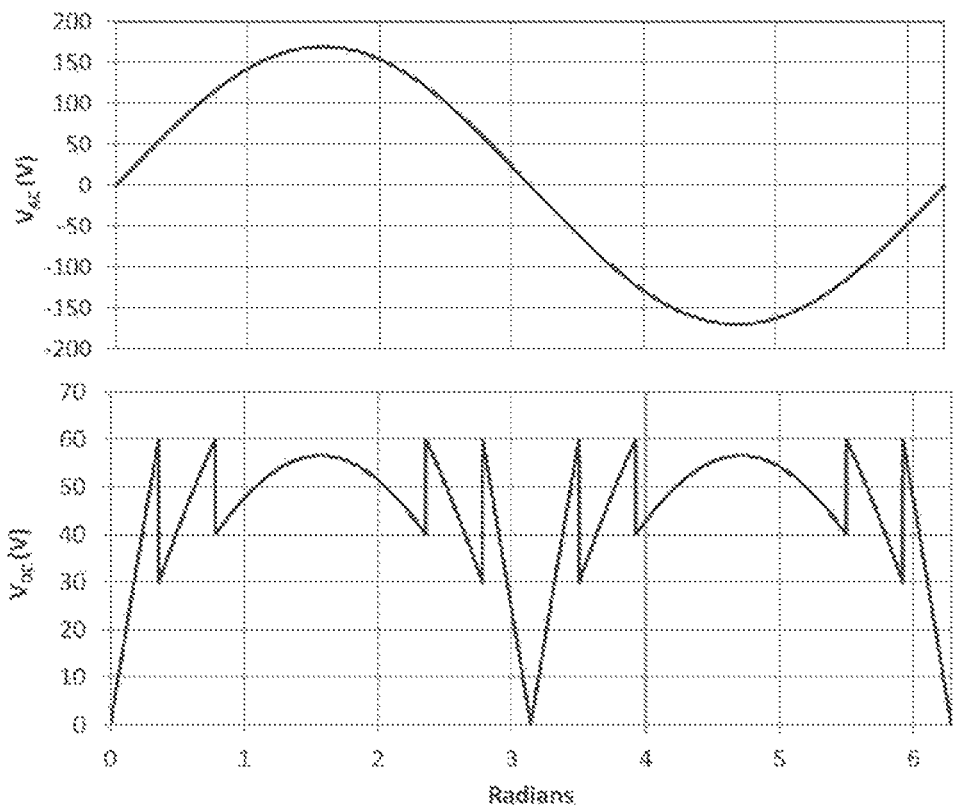
FIG. 23 shows an AC voltage rectified using a reconfigured switched-capacitor stage.

A diagram of a 120 $V_{RMS}$ AC waveform over a single 60 Hz cycle overlaid with the unfolded DC voltage is shown in FIG. 23. The AC switching network has different configurations (⅓, ½, 1/1) at its disposal along with an inverting stage. It was also designed to keep the DC voltage under 60 V. Once the AC voltage is unfolded, it is the job of the regulating circuit 16A, shown in FIG. 24, to produce a final output voltage. It may also be necessary to place another switching network 16A between the AC switching network 13A and regulating circuit 16A to further condition the voltage. If this is the case, then the caveats for series-connected stages hold true since the AC switching network 13A is a special purpose switching network 12A.

Figure 24:
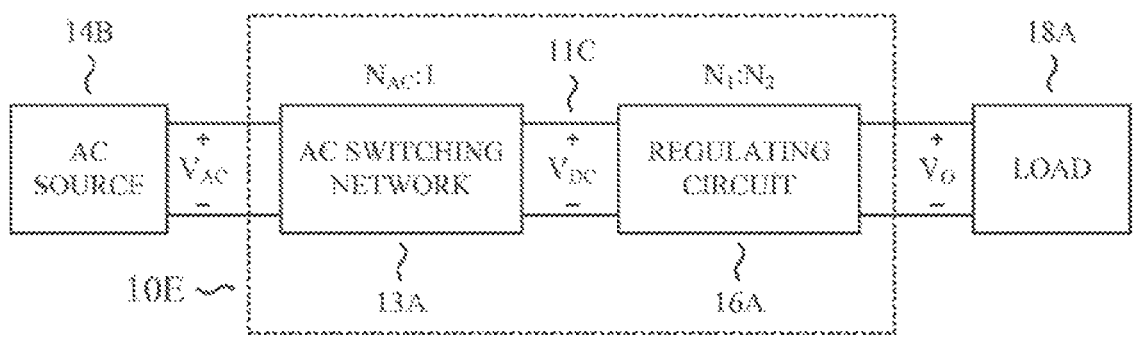
FIG. 24 shows an AC-DC power converter architecture.
Figure 27:
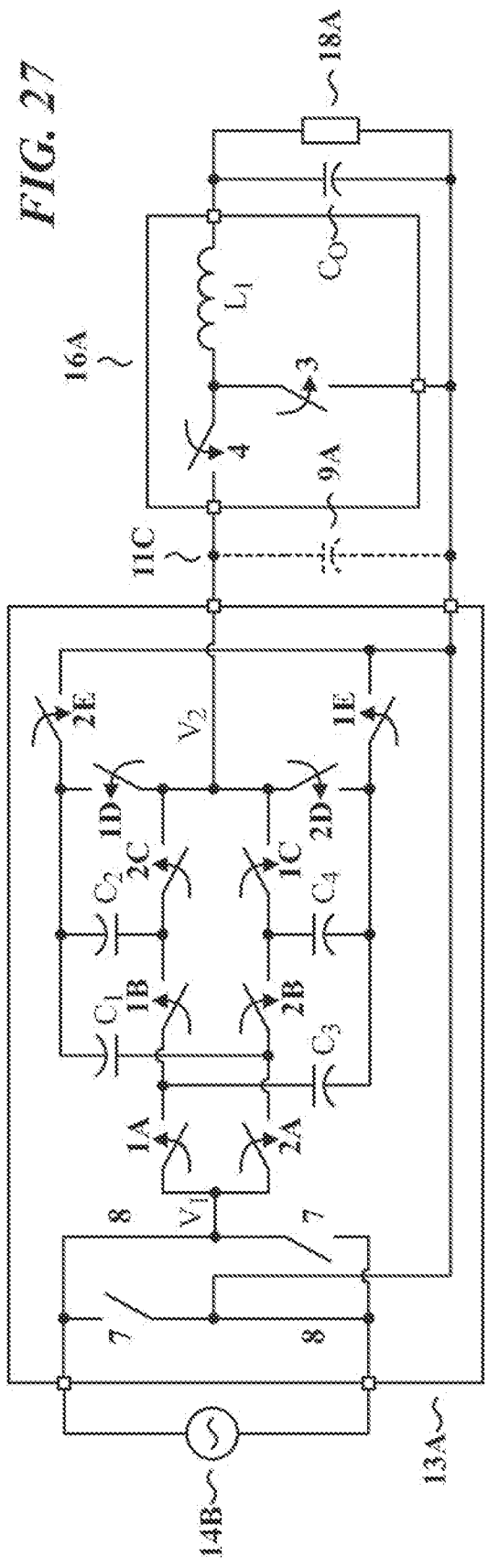
FIG. 27 shows the AC-DC converter illustrated in FIG. 25 during the negative portion of the AC cycle.

FIG. 25 shows the AC-DC converter corresponding to the architecture shown in FIG. 24. In this embodiment, the AC switching network 13A is a synchronous AC bridge followed by a reconfigurable two-phase step-down cascade multiplier with three distinct conversion ratios (⅓, ½, 1/1) while the regulating circuit 16A is a synchronous buck converter. In operation, switches labeled 7 and 8 are always in complementary states. During the positive portion of the AC cycle (0 to π radians) all switches 7 are closed while all switches labeled 8 are opened as shown in FIG. 26. Similarly, during the negative portion of the AC cycle (π to 2π radians) all switches labeled 8 are closed while all switches labeled 7 are opened as shown in FIG. 27.

In addition to the inverting function provided by switches 7 and 8, the switches labeled 1A-1E and switches labeled 2A-2E may be selectively opened and closed as shown in Table 1 to provide three distinct conversion ratios of: ⅓, ½ and 1.

TABLE 1

| $V_2/V_1$ | 1A | 1B | 1C | 1D | 1E | 2A | 2B | 2C | 2D | 2E |
|---|---|---|---|---|---|---|---|---|---|---|
| 1/3 | CLK | CLK | CLK | CLK | CLK | CLKB | CLKB | CLKB | CLKB | CLKB |
| 1/2 | CLKB | CLK | CLK | CLK | CLK | CLK | CLKB | CLKB | CLKB | CLKB |
| 1/1 | ON | ON | ON | OFF | OFF | ON | ON | ON | OFF | OFF |

The AC switching network 13A is provided with a digital clock signal CLK. A second signal CLKB is also generated, which may simply be the complement of CLK (i.e. is high when CLK is low and low when CLK is high), or which may be generated as a non-overlapping complement as is well known in the art. With a switching pattern set in accordance with the first row of Table 1, the AC switching network 13A provides a step-down ratio of one-third ($\frac{1}{3}$). With a switching pattern set in accordance with the second row of Table 1, the AC switching network 13A provides a step-down ratio of one-half ($\frac{1}{2}$). With a switching pattern set in accordance with the first row of Table 1, the AC switching network 13A provides a step-down ratio of one.

Figure 28:
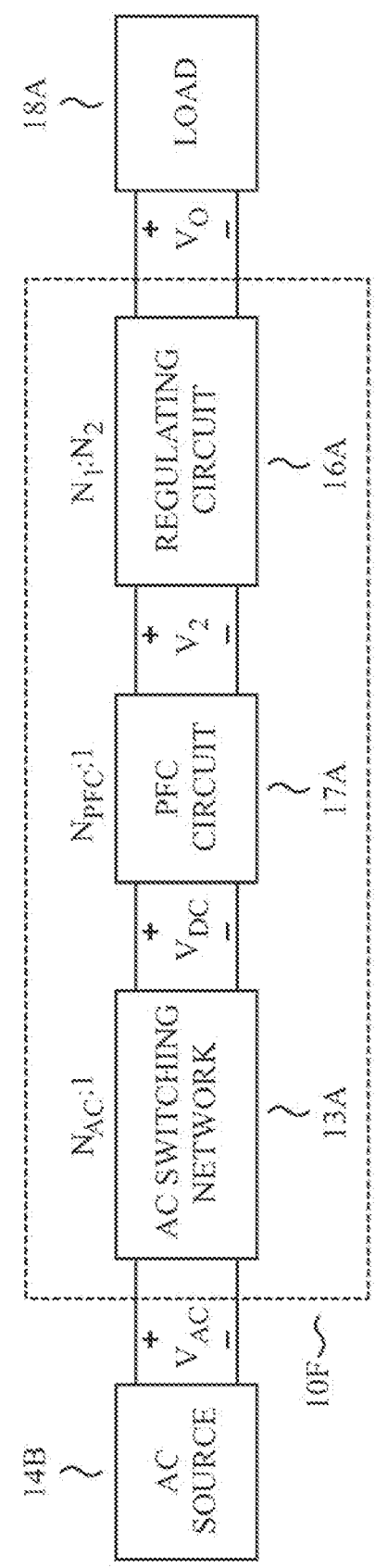
FIG. 28 shows an AC-DC power converter architecture with power-factor correction.

Most power supplies attached to the wall meet some power factor specification. Power factor is a dimensionless number between 0 and 1 that defines a ratio of the real power flowing to apparent power. A common way to control the harmonic current and thus boost the power factor is by using an active power factor corrector, as shown in FIG. 28. The power-factor correction circuit 17A causes the input current to be in phase with the line voltage, thus causing reactive power consumption to be zero.

FIGS. 29-36 show specific implementations of power converters that conform to the architectural diagrams shown in FIGS. 1-4. In each implementation a regulating circuit or multiple regulating circuits may limit both the RMS charging current and the RMS discharging current of at least one capacitor in each switching network so all of these switching networks are adiabatically charged switching networks. However, if decoupling capacitors 9A or 9B are present, then the ability of the regulating circuit to limit the RMS charging and discharging current may be diminished. Capacitors 9A and 9B are optional and to keep the output voltage fairly constant capacitor $C_o$ is used. Furthermore, for simplicity, the switching network in each implementation has a single conversion ratio. However, reconfigurable switching networks that provide power conversion at multiple distinct conversion ratios may be used instead.

In operation, switches labeled 1 and 2 are always in complementary states. Thus, in a first switched-state, all switches labeled "1" are open and all switches labeled "2" are closed. In a second switched-state, all switches labeled "1" are closed and all switches labeled "2" are opened. Similarly, switches labeled "3" are "4" are in complementary states, switches labeled "5" are "6" are in complementary states, and switches labeled "7" are "8" are in complementary states. Typically, the regulating circuits operate at higher switching frequencies than the switching networks. However, there is no requirement on the switching frequencies between and amongst the switching networks and regulating circuits.

Figure 29:
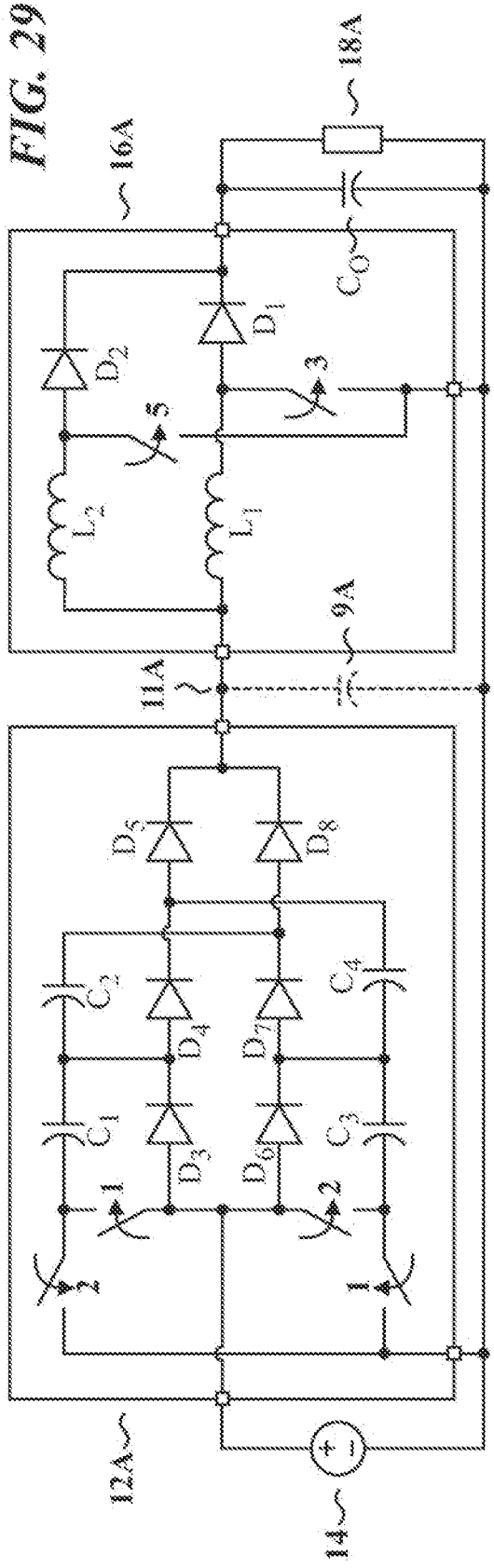
FIGS. 29 and 30 show particular implementations of the DC-DC converter illustrated in FIG. 1.

FIG. 29 shows a step-up converter corresponding to the architecture shown in FIG. 1. In this embodiment, the switching network 12A is a two-phase step-up cascade multiplier with a conversion ratio of 1:3 while the regulating circuit 16A is two-phase boost converter. In operation, closing switches labeled 1 and opening switches labeled 2 charges capacitors $C_3$ and $C_4$ while discharging capacitors $C_1$ and $C_2$. Conversely, opening switches labeled 1 and closing switches labeled 2 charges capacitors $C_1$, and $C_2$ while discharging capacitors $C_3$ and $C_4$.

Figure 30:
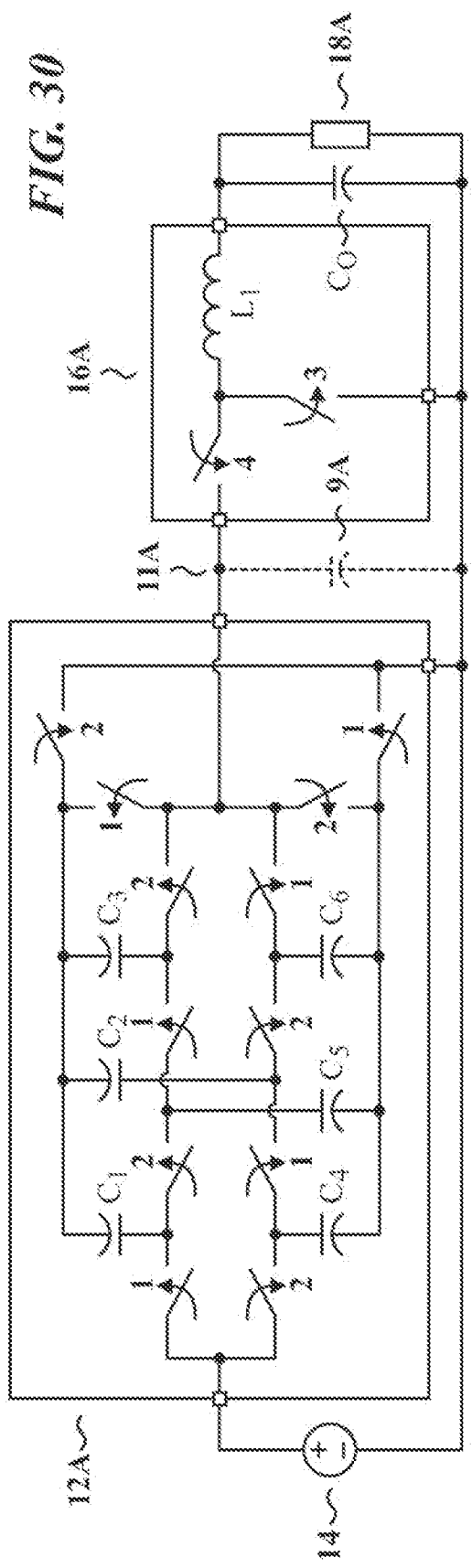

FIG. 30 shows bidirectional step-down converter corresponding to the architecture shown in FIG. 1A. In this embodiment, the switching network 12A is a two-phase step-down cascade multiplier with a conversion ratio of 4:1 while the regulating circuit 16A is synchronous buck converter. In operation, closing switches labeled 1 and opening switches labeled 2 charges capacitors $C_1$, $C_2$, and $C_3$ while discharging capacitors $C_4$, $C_5$, and $C_6$. Conversely, opening switches labeled 1 and closing switches labeled 2 charges capacitors $C_4$, $C_5$, and $C_6$ while discharging capacitors $C_1$, $C_2$, and $C_3$. All of the active components are implemented with switches so the converter can process power in both directions.

Figure 31:
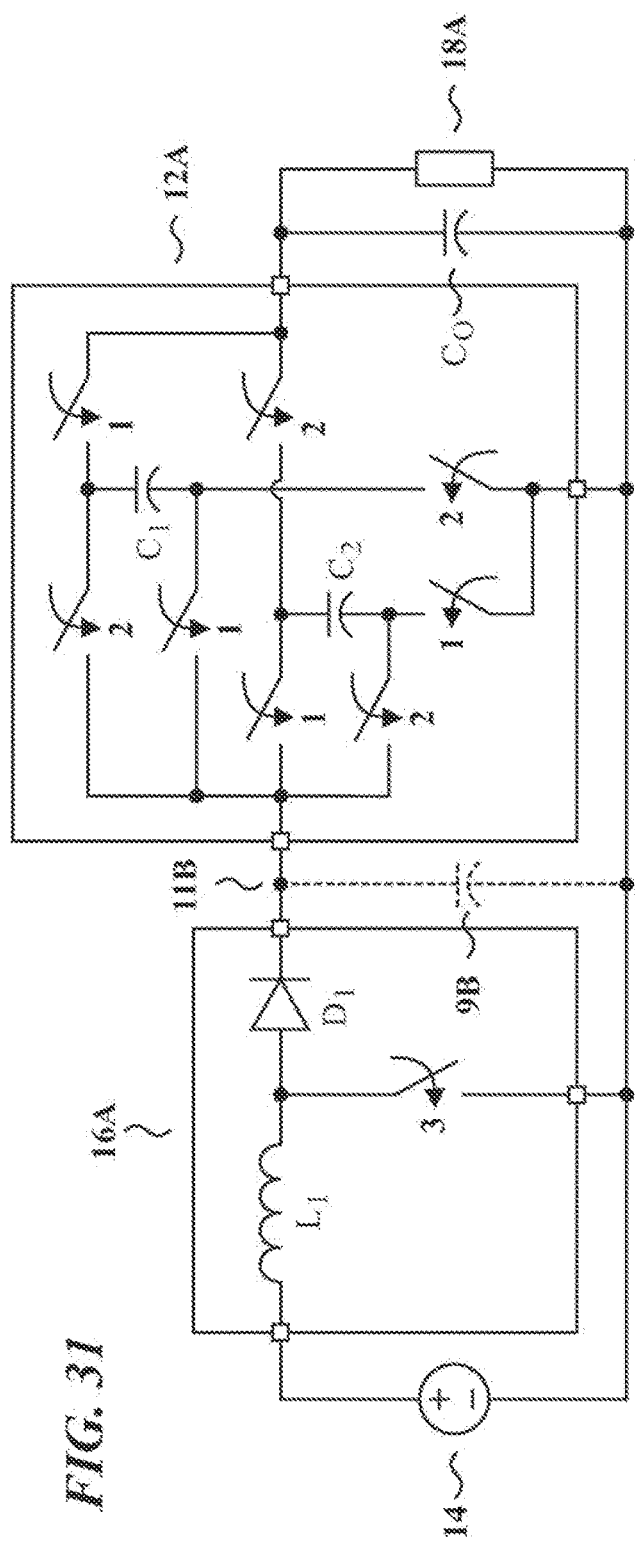
FIGS. 31 and 32 show particular implementations of the DC-DC converter illustrated in FIG. 3.

FIG. 31 shows a step-up converter consistent with the architecture shown in FIG. 3. In this embodiment, the regulating circuit 16A is boost converter while the switching network 12A is a two-phase step-up series-parallel SC converter with a conversion ratio of 2:1. In operation, closing switches 1 charges capacitor $C_2$ while discharging capacitor $C_1$. Closing switches 2 has the complementary effect.

Figure 32:
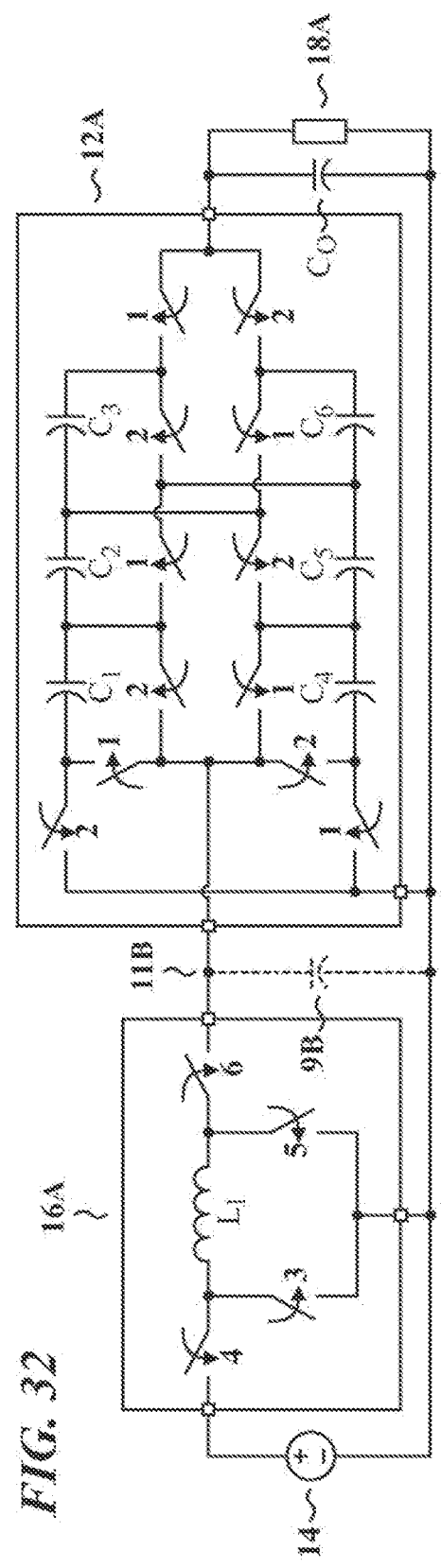

FIG. 32 shows a bidirectional up-down converter consistent with the architecture shown in FIG. 3. In this embodiment, the regulating circuit 16A is synchronous four switch buck-boost converter while the switching network 12A is a two-phase step-up cascade multiplier with a conversion ratio of 4:1. In operation, closing switches labeled 1 charges capacitors $C_4$, $C_5$, and $C_6$ while discharging capacitors $C_1$, $C_2$, and $C_3$. Closing switches 2 has the complementary effect. All of the active components are implemented with switches so the converter can process power in both directions.

Figure 33:
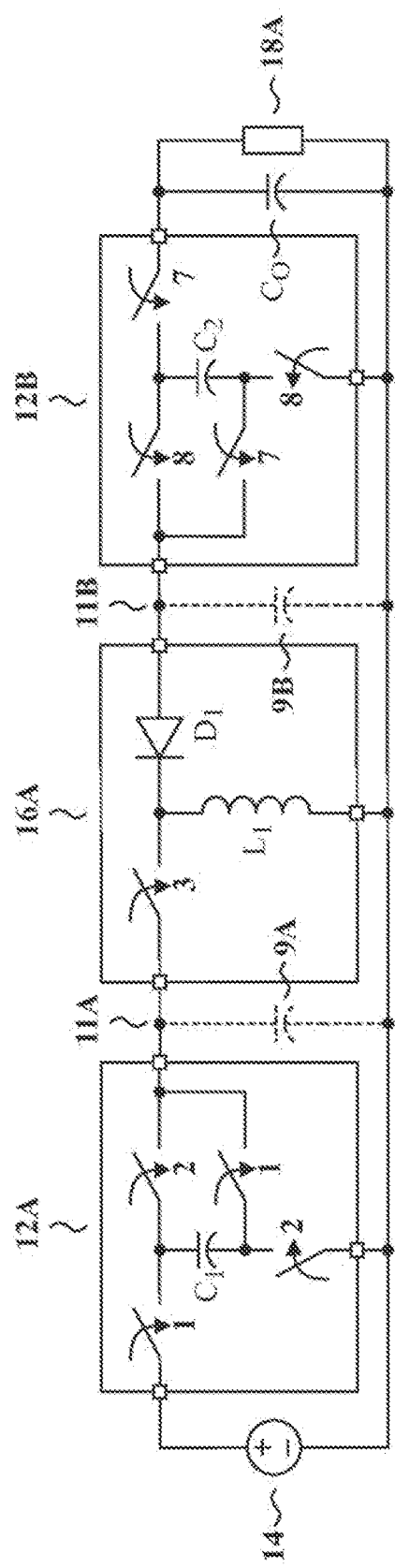
FIGS. 33 and 34 show particular implementations of the DC-DC converter illustrated in FIG. 2.

FIG. 33 shows an inverting up-down converter consistent with the architecture shown in FIG. 2. In this embodiment, the switching network 12A is a step-up series-parallel SC converter with a conversion ratio of 2:1, the regulating circuit 16A is a buck/boost converter and the switching network 12B is a step-up series-parallel SC converter with a conversion ratio of 2:1. In operation, closing switches 1 charges capacitor $C_1$ while closing switches 2 discharges capacitor $C_1$. Similarly, closing switches 7 discharges capacitor $C_2$ while closing switches 8 charges capacitor $C_2$.

Figure 34:
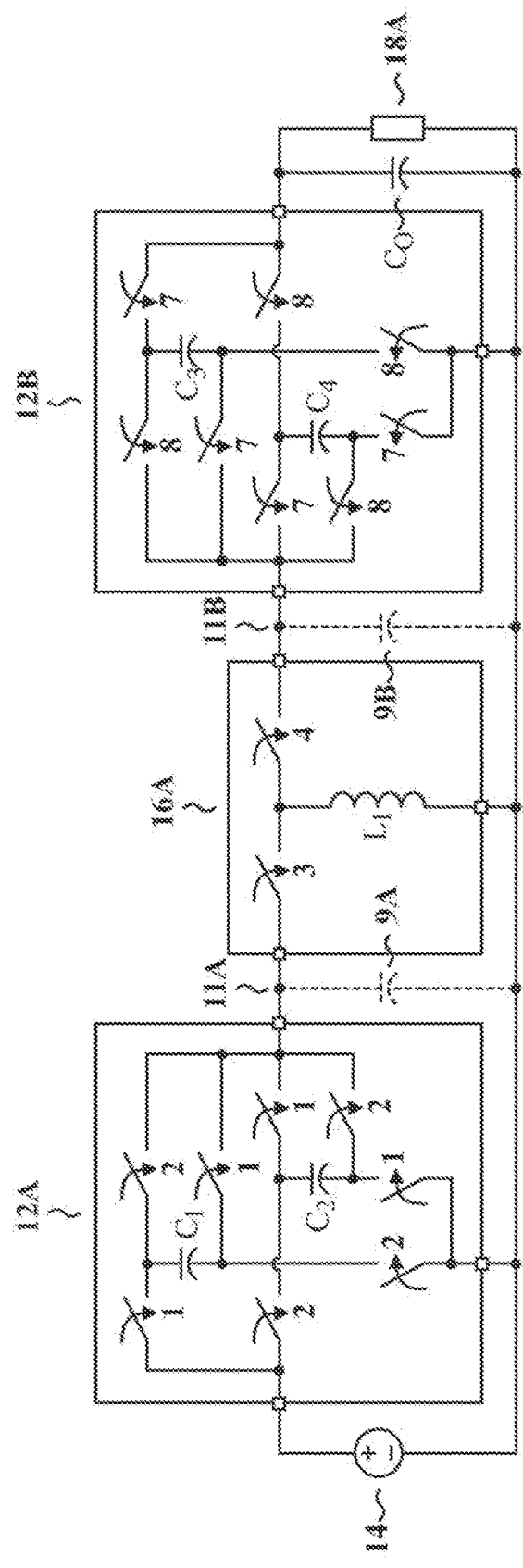

FIG. 34 shows a bidirectional inverting up-down converter consistent with the architecture shown in FIG. 2. In this embodiment, the switching network 12A is a two-phase step-up series-parallel SC converter with a conversion ratio of 2:1, the regulating circuit 16A is a synchronous buck/boost converter and the switching network 12B is a two-phase step-up series-parallel SC converter with a conversion ratio of 2:1. In operation, closing switches 1 charges capacitor $C_1$ while discharging capacitor $C_2$. Closing switches 2 has the complementary effect. Similarly, closing switches 7 charges capacitor $C_4$ while discharging capacitor $C_3$. Closing switches 2 has the complementary effect. All of the active components are implemented with switches so the converter can process power in both directions.

Figure 35:
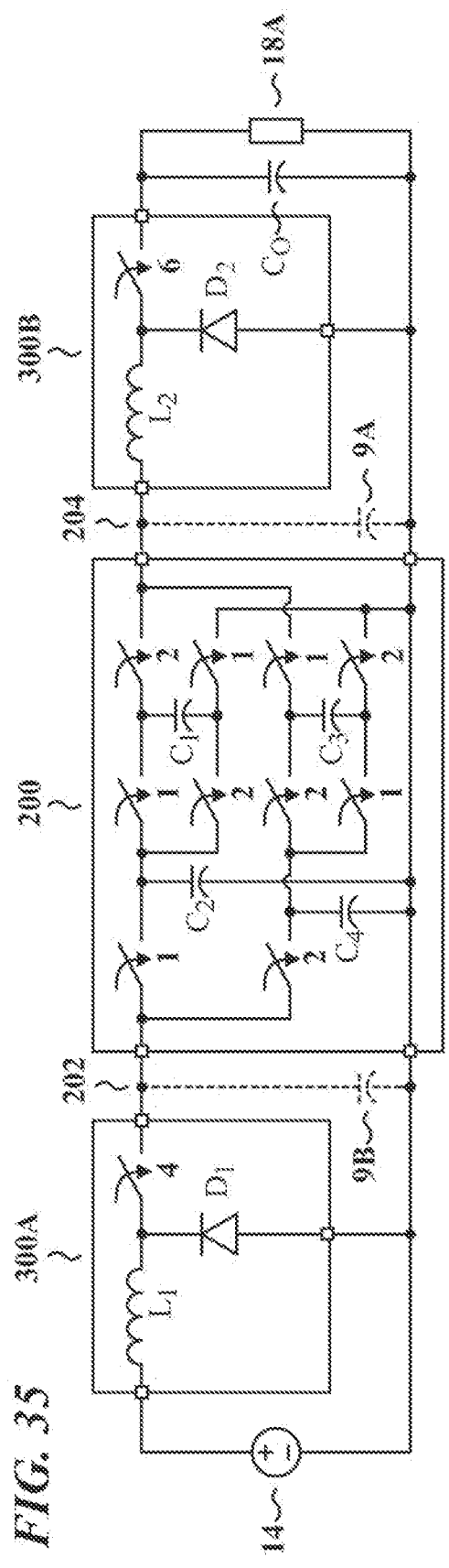
FIGS. 35 and 36 show particular implementations of the DC-DC converter illustrated in FIG. 4.

FIG. 35 shows a step-down converter consistent with the block diagram shown in FIG. 4. In this embodiment, the regulating 300A is a boost converter, the switching network 200 is a two-phase step-up series-parallel SC converter with a conversion ratio of 2:1 and the regulating circuit 300B is a boost converter. In operation, closing switches labeled 1 charges capacitors $C_1$ and $C_2$ while simultaneously discharging capacitors $C_3$ and $C_4$. Closing switches 2 has the complementary effect.

Figure 36:
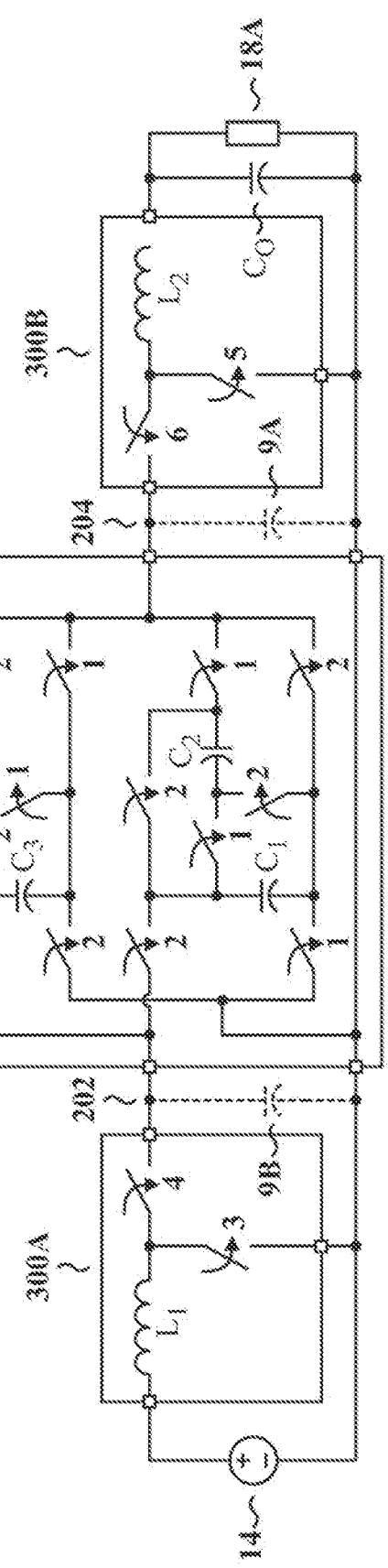

FIG. 36 shows a bidirectional up-down converter consistent with the block diagram shown in FIG. 4. In this embodiment, the regulating 300A is a synchronous boost converter, the switching network 200 is a two-phase fractional step-down series-parallel SC converter with a conversion ratio of 3:2 and the regulating circuit 300B is a synchronous buck converter. In operation, closing switches 1 charges capacitors $C_3$ and $C_4$ while simultaneously discharging capacitors $C_1$ and $C_2$. Closing switches 2 has the complementary effect. All of the active components are implemented with switches so the converter can process power in both directions.

It should be understood that the topology of the regulating circuit can be any type of power converter with the ability to regulate the output voltage, including, but without limitation, synchronous buck, three-level synchronous buck, SEPIC, soft switched or resonant converters. Similarly, the switching networks can be realized with a variety of switched-capacitor topologies, depending on desired voltage transformation and permitted switch voltage.

Having described one or more preferred embodiments, it will be apparent to those of ordinary skill in the art that other embodiments incorporating these circuits, techniques and concepts may be used. Accordingly, it is submitted that the scope of the patent should not be limited to the described embodiments, but rather, should be limited only by the spirit and scope of the appended claims.

The invention claimed is:

1. A power converter comprising:
a plurality of switches configured to be connected to a plurality of capacitors to form a first switched-capacitor converter and configured to switch between a plurality of switching configurations to charge or discharge the plurality of capacitors such that the first switched-capacitor converter transforms a first voltage into a second voltage, wherein the first switched-capacitor converter is configured to couple to one or more switched-capacitor converters,
wherein the plurality of switches comprises a first set of switches and a second set of switches, wherein, in a first switching configuration of the plurality of switching configurations, the first set of switches are configured to be turned on and the second set of switches are configured to be turned off, and wherein, in a second switching configuration of the plurality of switching configurations, the first set of switches are configured to be turned off and the second set of switches are configured to be turned on,
wherein each switch of the second set of switches is coupled to at least one switch of the first set of switches,
wherein, for each switch of the second set of switches, a node between the switch of the second set of switches and the at least one switch of the first set of switches coupled to the switch of the second set of switches is configured to be connected to a corresponding one of the plurality of capacitors, and
wherein, for each switch of a first subset of the second set of switches, the switch of the first subset and the at least one switch of the first set of switches coupled to the switch of the first subset are coupled between a pair of nodes configured to be coupled to a regulating circuit.

2. The power converter of claim 1, wherein, for each switch of the first subset of the second set of switches, the node between the switch of the first subset and the at least one switch of the first set of switches coupled to the switch of the first subset is configured to be connected to a negative terminal of the corresponding one of the plurality of capacitors.

3. The power converter of claim 1, wherein the first subset of the second set of switches comprises:
a first switch coupled to a first node of the pair of nodes, wherein the at least one switch of the first set of switches coupled to the first switch is coupled to a second node of the pair of nodes; and
a second switch coupled to the second node of the pair of nodes, wherein the at least one switch of the first set of switches coupled to the second switch is coupled to the first node of the pair of nodes.

4. The power converter of claim 1, wherein, for each switch of a second subset of the second set of switches, the node between the switch of the second subset and the at least one switch of the first set of switches coupled to the switch of the second subset is configured to be connected to a positive terminal of the corresponding one of the plurality of capacitors.

5. The power converter of claim 4, wherein the second subset of the second set of switches comprises a first switch, wherein the at least one switch of the first set of switches coupled to the first switch comprises a second switch and a third switch, wherein the first switch is coupled to the second switch and the third switch, wherein the node between the first switch and the second switch is configured to be connected to the positive terminal of a first capacitor of the plurality of capacitors, and wherein the node between the first switch and the third switch is configured to be connected to the positive terminal of a second capacitor of the plurality of capacitors.

6. The power converter of claim 1, further comprising a controller configured to control the plurality of switches to cause the plurality of switches to switch between the plurality of switching configurations.

7. The power converter of claim 1, wherein the one or more switched-capacitor converters comprise a second switched-capacitor converter, wherein the power converter further comprises the second switched-capacitor converter, and wherein the second switched-capacitor converter is serially connected to the first switched-capacitor converter.

8. The power converter of claim 7, wherein the second switched-capacitor converter comprises:
a second plurality of capacitors; and
a second plurality of switches configured to be connected to the second plurality of capacitors and configured to switch between a second plurality of switching configurations to charge or discharge the second plurality of capacitors, wherein at least one switch of the plurality of switches of the first switched-capacitor converter is connected to at least one switch of the second plurality of switches of the second switched-capacitor converter,
wherein the first switched-capacitor converter and the second switched-capacitor converter are configured to be coupled to the regulating circuit.

9. The power converter of claim 1, further comprising:
the first switched-capacitor converter comprising the plurality of switches and the plurality of capacitors; and
the regulating circuit coupled to the first switched-capacitor converter.

10. The power converter of claim 9, wherein:
the regulating circuit is connected to at least one switch of the first set of switches and at least one switch of the second set of switches; and
the regulating circuit is configured to:
receive the second voltage; and
provide a regulated voltage based at least in part on the second voltage to one or more loads.

11. The power converter of claim 9, wherein the regulating circuit comprises a multi-phase regulating circuit.

12. The power converter of claim 9, wherein the regulating circuit comprises:
one or more inductors; and
a second plurality of switches, wherein each inductor of the one or more inductors is coupled to at least one switch of the second plurality of switches.

13. The power converter of claim 9, wherein the one or more switched-capacitor converters comprise a second switched-capacitor converter, wherein the power converter further comprises the second switched-capacitor converter, and wherein the second switched-capacitor converter is serially connected to the first switched-capacitor converter.

14. The power converter of claim 13, wherein the regulating circuit is further coupled to the second switched-capacitor converter.

15. The power converter of claim 13, wherein the second switched-capacitor converter comprises:
a second plurality of capacitors; and
a second plurality of switches configured to be connected to the second plurality of capacitors and configured to switch between a second plurality of switching configurations to charge or discharge the second plurality of capacitors, wherein at least one switch of the plurality of switches of the first switched-capacitor converter is connected to at least one switch of the second plurality of switches of the second switched-capacitor converter.

16. The power converter of claim 15, further comprising one or more controllers configured to control the plurality of switches and the second plurality of switches.

17. A method comprising:
switching a plurality of switches of a first switched-capacitor converter between a plurality of switching configurations to charge or discharge a plurality of capacitors of the first switched-capacitor converter, wherein the first switched-capacitor converter is configured to couple to one or more switched-capacitor converters, wherein the plurality of switches comprises a first set of switches and a second set of switches, wherein, in a first switching configuration of the plurality of switching configurations, the first set of switches are turned on and the second set of switches are turned off, and wherein, in a second switching configuration of the plurality of switching configurations, the first set of switches are turned off and the second set of switches are turned on, wherein each switch of the second set of switches is coupled to at least one switch of the first set of switches, wherein, for each switch of the second set of switches, a node between the switch of the second set of switches and the at least one switch of the first plurality of switches coupled to the switch of the second set of switches is connected to a corresponding one of the plurality of capacitors, and wherein, for each switch of a subset of the second set of switches, the switch of the subset and the at least one switch of the first set of switches coupled to the switch of the subset are coupled between a pair of nodes coupled to a regulating circuit; and
transforming a first voltage into a second voltage based on the switching.

18. The method of claim 17, wherein the regulating circuit is connected to at least the first switched-capacitor converter, the method further comprising providing, by the regulating circuit, a regulated voltage based at least in part on the second voltage to one or more loads.

19. The method of claim 18, wherein the one or more switched-capacitor converters comprise a second switched-capacitor converter serially connected to the first switched-capacitor converter, the method further comprising:
switching a second plurality of switches of the second switched-capacitor converter between a second plurality of switching configurations to charge or discharge a second plurality of capacitors of the second switched-capacitor converter; and
transforming a third voltage into a fourth voltage based on the switching the second plurality of switches, wherein a ratio of the first voltage to the second voltage is the same as a ratio of the third voltage to the fourth voltage.

20. The method of claim 19, wherein the regulating circuit is further connected to the second switched-capacitor converter.

* * * * *

UNITED STATES PATENT AND TRADEMARK OFFICE
CERTIFICATE OF CORRECTION

PATENT NO. : 12,381,482 B2  
APPLICATION NO. : 18/470434  
DATED : August 5, 2025  
INVENTOR(S) : David M. Giuliano Page 1 of 1

It is certified that error appears in the above-identified patent and that said Letters Patent is hereby corrected as shown below:

In the Specification

Column 1, Lines 8-9, change "U.S. application Ser. No." to --U.S. Application No.--.

Column 1, Lines 10-11, change "U.S. application Ser. No." to --U.S. Application No.--.

Column 1, Lines 12-13, change "U.S. application Ser. No." to --U.S. Application No.--.

Column 1, Lines 14-15, change "U.S. application Ser. No." to --U.S. Application No.--.

Column 1, Lines 16-17, change "U.S. application Ser. No." to --U.S. Application No.--.

Column 1, Lines 18-19, change "U.S. application Ser. No." to --U.S. Application No.--.

Column 1, Lines 20-21, change "U.S. application Ser. No." to --U.S. Application No.--.

Column 1, Lines 22-23, change "U.S. application Ser. No." to --U.S. Application No.--.

Column 1, Lines 24-25, change "U.S. application Ser. No." to --U.S. Application No.--.

Column 8, Line 54, change "$(E_{loss}=I_{RMS}^2 R_{eff}=1/2C\times\Delta_{C2})$" to --$(E_{loss}=I_{RMS}^2 R_{eff}=1/2C\times\Delta V_{C2})$--.

Column 9, Line 16, change "$V_1+(n-1)/v_{pump}$" to --$V_1+(n-1)\times v_{pump}$--.

Column 10, Line 32, change "$i_{clk}$ & $\overline{i_{clk}}$" to --$i_{clk}$ & $\overline{i_{clk}}$--.

Column 10, Line 56, change "$i_{clk}$ & $\overline{i_{clk}}$" to --$i_{clk}$ & $\overline{i_{clk}}$--.

Signed and Sealed this  
Thirtieth Day of September, 2025

John A. Squires  
*Director of the United States Patent and Trademark Office*